United States Patent
Tsukada

(10) Patent No.: US 11,265,432 B2
(45) Date of Patent: Mar. 1, 2022

(54) PRINTING APPARATUS INCLUDING A PLURALITY OF FEEDING UNITS, CONTROL METHOD, AND COMPUTER-READABLE STORAGE MEDIUM

(71) Applicant: CANON KABUSHIKI KAISHA, Tokyo (JP)

(72) Inventor: Nobuyuki Tsukada, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/943,954

(22) Filed: Jul. 30, 2020

(65) Prior Publication Data

US 2021/0044707 A1 Feb. 11, 2021

(30) Foreign Application Priority Data

Aug. 9, 2019 (JP) .............................. JP2019-147730

(51) Int. Cl.
*H04N 1/31* (2006.01)
*H04N 1/00* (2006.01)
*H04N 1/23* (2006.01)

(52) U.S. Cl.
CPC ..... *H04N 1/00411* (2013.01); *H04N 1/00588* (2013.01); *H04N 1/2338* (2013.01)

(58) Field of Classification Search
CPC .......... H04N 1/00411; H04N 1/00567; H04N 1/00623; H04N 1/00694; H04N 1/2353
USPC .................... 358/1.13, 1.15; 399/12, 23, 81; 271/9.01, 9.05
See application file for complete search history.

(56) References Cited

U.S. PATENT DOCUMENTS

| 5,126,786 A | * | 6/1992 | Tanaka .................... G03G 15/50 355/46 |
| 2009/0103938 A1 | * | 4/2009 | Kiriyama ........... G03G 15/6508 399/82 |
| 2010/0178067 A1 | * | 7/2010 | Azami ............... G03G 15/6508 399/16 |
| 2015/0254025 A1 | | 9/2015 | Watanabe |

(Continued)

FOREIGN PATENT DOCUMENTS

| CN | 101166220 A | 4/2008 |
| EP | 1800877 A1 | 6/2007 |
| GN | 102087588 A | 6/2011 |

(Continued)

*Primary Examiner* — Jamares Q Washington
(74) *Attorney, Agent, or Firm* — Canon U.S.A., Inc. I.P. Division

(57) ABSTRACT

A printing apparatus includes a feeding units, a detecting unit, a designating unit, and a control unit. The detecting unit detects a respective operation on each of the feeding units. The designating unit designates, in response to a user operation via a display, which of the feeding units is to be used for printing. The control unit executes, in response to a command to execute predetermined printing, a process based on a first feeding unit on which an operation has been last detected by the detecting unit and a second feeding unit designated by the designating unit. Based on that the first and second feeding units are different, the control unit displays, as the process, a predetermined screen on the display. Based on that the first and second feeding units are the same, the control unit executes, as the process, the predetermined printing on a second feeding unit fed sheet.

16 Claims, 18 Drawing Sheets

(56) References Cited

U.S. PATENT DOCUMENTS

2019/0086849 A1   3/2019   Sasaki

FOREIGN PATENT DOCUMENTS

| GN | 103246487 A | 8/2013 |
| JP | H02-120066 A | 5/1990 |
| JP | 2006-018463 A | 1/2006 |

* cited by examiner

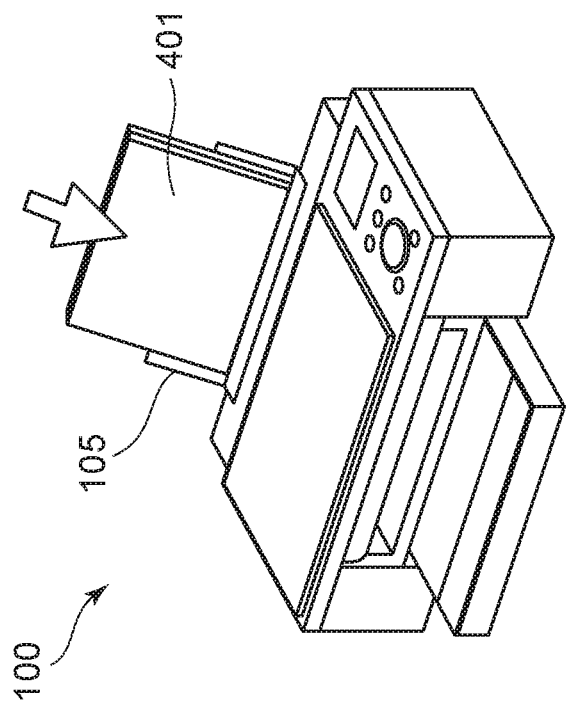
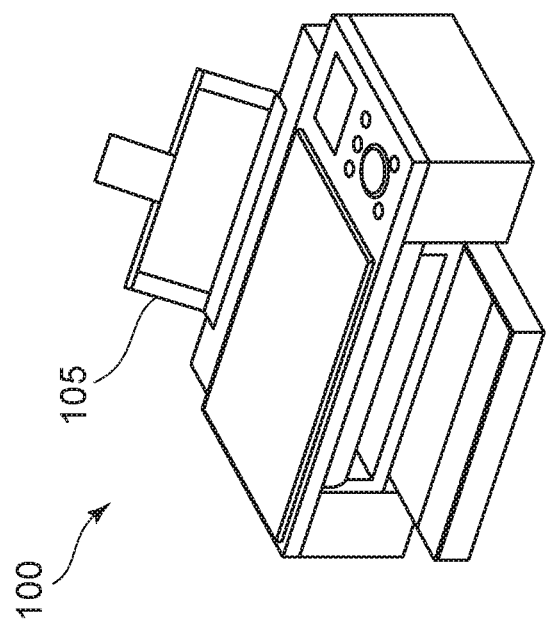

FIG. 5

| VALUE | FEEDING UNIT INFORMATION |
|---|---|
| 0 | UNDETECTED |
| 1 | SHEET FEEDING CASSETTE |
| 2 | REAR TRAY |

PRINTING APPARATUS INCLUDING A PLURALITY OF FEEDING UNITS, CONTROL METHOD, AND COMPUTER-READABLE STORAGE MEDIUM

BACKGROUND

Field

The present disclosure relates to a printing apparatus including a plurality of feeding units.

Description of the Related Art

Printing apparatuses including a plurality of feeding units that feed printing sheets are available. Japanese Patent Laid-Open No. 2006-18463 describes technology for a printing apparatus including a plurality of feeding units to feed sheets from a feeding unit according to a setting made by a user, and to execute printing.

In a printing apparatus as described in Japanese Patent Laid-Open No. 2006-18463, a user may happen to designate a wrong feeding unit that differs from a feeding unit intended by the user to feed sheets.

SUMMARY

The present disclosure provides technology that allows a user to be notified that a feeding unit not intended or not designated by the user is designated as a feeding unit used for printing.

According to an aspect of the present disclosure, a printing apparatus including a plurality of feeding units includes a detecting unit configured to detect a respective operation on each of the plurality of feeding units, a designating unit configured to designate, in response to an operation by a user via a display, which of the plurality of feeding units is to be used for printing, and a control unit configured to execute, in response to a command to execute predetermined printing, a process based on a first feeding unit, from the plurality of feeding units, on which an operation has been last detected by the detecting unit and a second feeding unit, from the plurality of feeding units, designated by the designating unit, wherein, based on that the first feeding unit and the second feeding unit are different, the control unit displays, as the process, a predetermined screen on the display, and wherein, based on that the first feeding unit and the second feeding unit are the same, the control unit executes, as the process, the predetermined printing on a sheet fed from the second feeding unit.

Further features of the present disclosure will become apparent from the following description of exemplary embodiments with reference to the attached drawings.

BRIEF DESCRIPTION OF THE DRAWINGS

FIGS. 4A and 4B are diagrams for describing an operation performed by the user on a rear tray.

FIG. 5 is a diagram for describing feeding unit information indicating a feeding unit operated by the user.

DESCRIPTION OF THE EMBODIMENTS

Hereinafter, embodiments of the present disclosure will be described in detail with reference to the accompanying drawings. Note that the following embodiments are not construed to limit the present disclosure according to the appended claims, and not all combinations of features described in the embodiments are necessarily required.

First Embodiment

Figure 1:
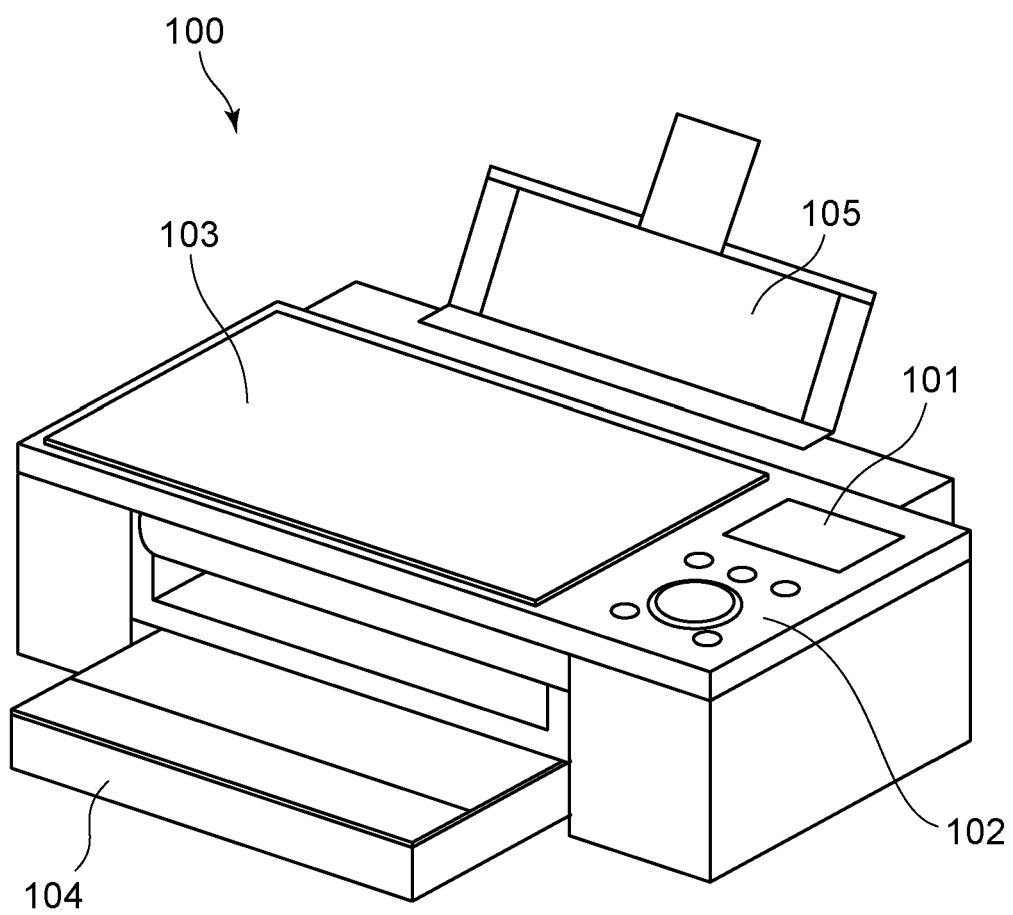
FIG. 1 is a diagram illustrating the appearance of a printing apparatus.

FIG. 1 is a diagram illustrating the appearance of a printing apparatus 100 according to a first embodiment. The printing apparatus 100 has not only a printing function of printing images on sheets, but also a reading function of reading an original, as will be described later. A liquid crystal panel 101 is a display that displays various types of information, such as a menu screen indicating various functions to be executed by the printing apparatus 100, various messages for a user, and images to be printed. Operation buttons 102 are buttons for receiving operations performed by the user. An original platen 103 is a mechanism for the user to place an original to be read by the printing apparatus 100. A sheet feeding cassette 104 and a rear tray 105 are feeding units for the user to load sheets used for printing. The sheet feeding cassette 104 and the rear tray 105 are each provided with a feeding mechanism for feeding sheets. Sheets loaded in the sheet feeding cassette 104 and the rear tray 105 are fed by the respective feeding mechanisms to a later-described printing mechanism. Note that such sheet feeding mechanisms may be provided in the sheet feeding cassette 104 and the rear tray 105, may be provided in a later-described printing mechanism 208, or may be provided in the sheet feeding cassette 104 and the rear tray 105 as well as in the printing mechanism 208.

Figure 2:
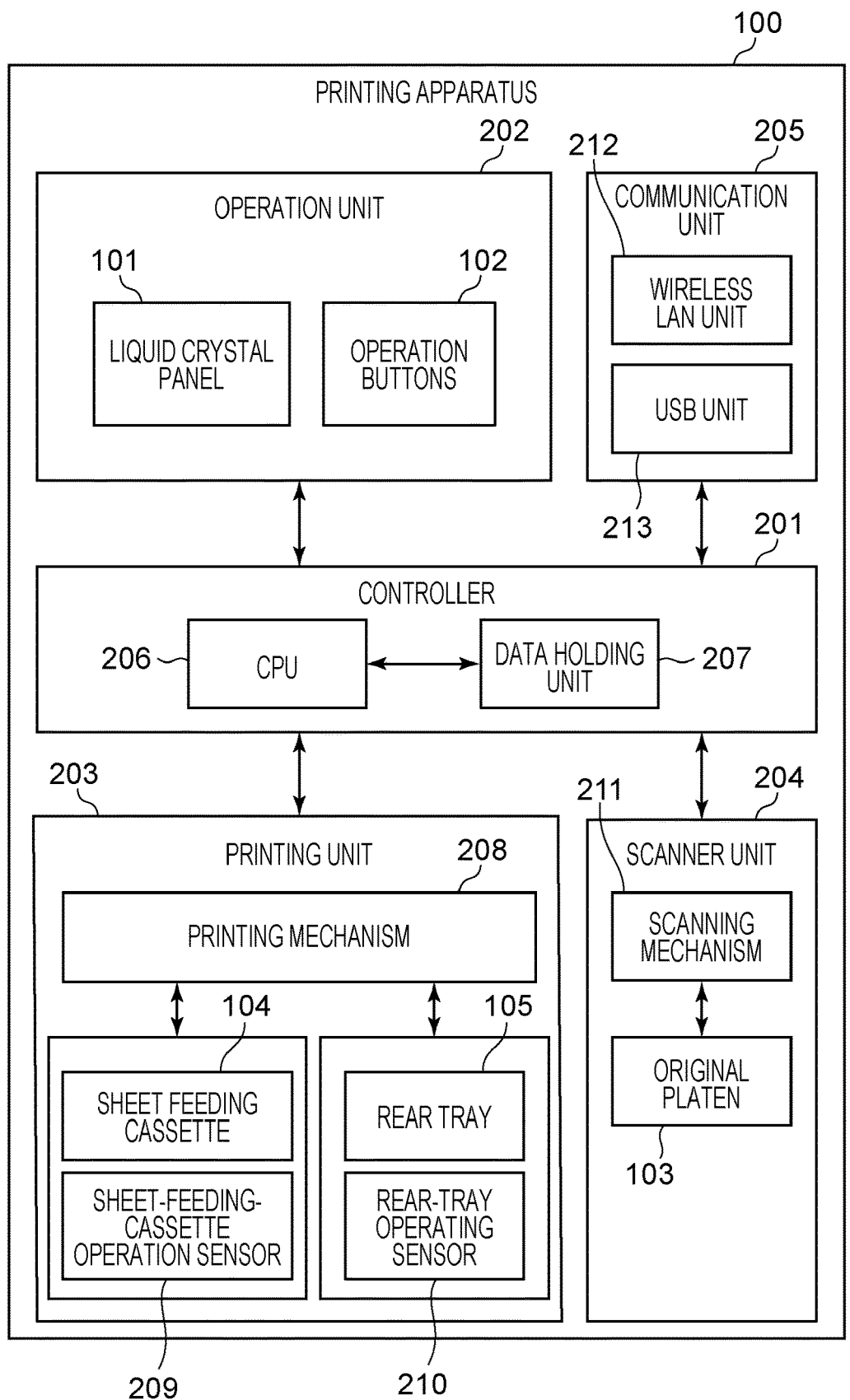
FIG. 2 is a functional block diagram of the printing apparatus.

FIG. 2 is a functional block diagram illustrating the configuration of the printing apparatus 100. A controller 201 performs various types of control of the printing apparatus 100. The controller 201 includes a central processing unit (CPU) 206 and a data holding unit 207. The data holding unit 207 includes read-only memory (ROM) and random-access memory (RAM), and holds images and control data. In addition, various control programs for controlling the printing apparatus 100 are stored in the ROM of the data holding unit 207. By executing the control programs on the RAM included in the data holding unit 207, the CPU 206 may execute various types of control of the printing apparatus 100, including printing control and reading control, which will be described later.

An operation unit 202 includes the above-described liquid crystal panel 101, which displays the state of the apparatus or a setting menu, and the above-described operation buttons 102, with which the user performs operations. For example, the user may move a cursor displayed on the liquid crystal panel 101 to give a command. Alternatively, the liquid crystal panel 101 may be configured as a touchscreen. In this case, the user may touch the liquid crystal panel 101 to give a command. The user's designation of a feeding unit, a command to start copying, and the like, which will be described later, are performed by operations performed by the user on the operation unit 202.

A printing unit 203 is a configuration for feeding sheets and printing images on the sheets. The printing unit 203 includes the sheet feeding cassette 104, which serves as a feeding unit, and a sheet-feeding-cassette operation sensor 209. The sheet feeding cassette 104 is configured to be detachable from the printing apparatus 100. The user may detach the sheet feeding cassette 104 from the printing apparatus 100, place sheets in the sheet feeding cassette 104, and re-attach the sheet feeding cassette 104 to the printing apparatus 100, thereby loading the sheets. The sheet-feeding-cassette operation sensor 209 is capable of detecting attachment of the sheet feeding cassette 104 to the printing apparatus 100.

The printing unit 203 further includes the rear tray 105, which serves as a feeding unit, and a rear-tray operation sensor 210. The rear tray 105 is, as illustrated in FIG. 1, a configuration for the user to place sheets. The rear-tray operation sensor 210 detects loading of sheets on the rear tray 105.

The printing unit 203 further includes the printing mechanism 208. The printing mechanism 208 includes, as mechanisms for feeding sheets from the sheet feeding cassette 104 and the rear tray 105, a feeding roller and a feeding motor. The printing mechanism 208 further includes a print head (not illustrated) for ejecting ink to sheets or applying toner to sheet. Printing is executed by the printhead on sheets fed as described above.

A scanner unit 204 is a configuration for reading an original. The scanner unit 204 includes the original platen 103, described with reference to FIG. 1, and a scanning mechanism 211. The scanning mechanism 211 applies light from a light source (not illustrated) to an original loaded on the original platen 103, and receives reflected light using an optical sensor (not illustrated), thereby reading an image.

Note that the printing apparatus 100 has a copy function and is capable of printing an image using the printing unit 203 on the basis of image data of an original read using the scanner unit 204.

A communication unit 205 includes a wireless local area network (LAN) unit 212, which performs data communication with a host device using a wireless LAN system, and a universal serial bus (USB) unit 213, which is connected to a USB cable and which performs data communication with the host device via the USB cable.

Figure 3B:
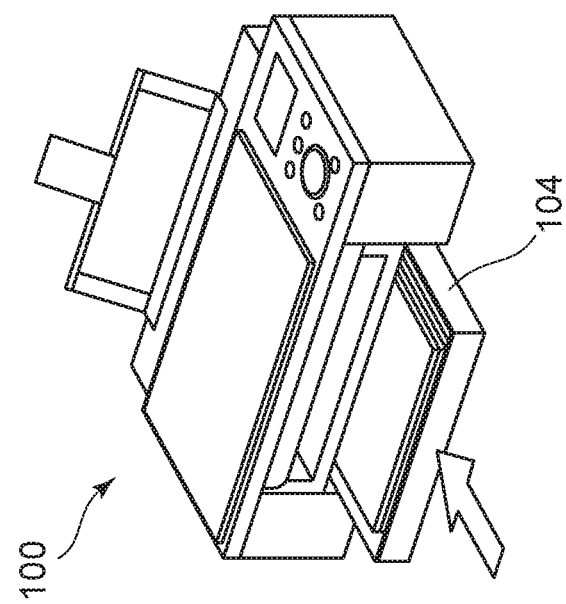
FIGS. 3A and 3B are diagrams for describing an operation performed by a user on a sheet feeding cassette.
Figure 3A:
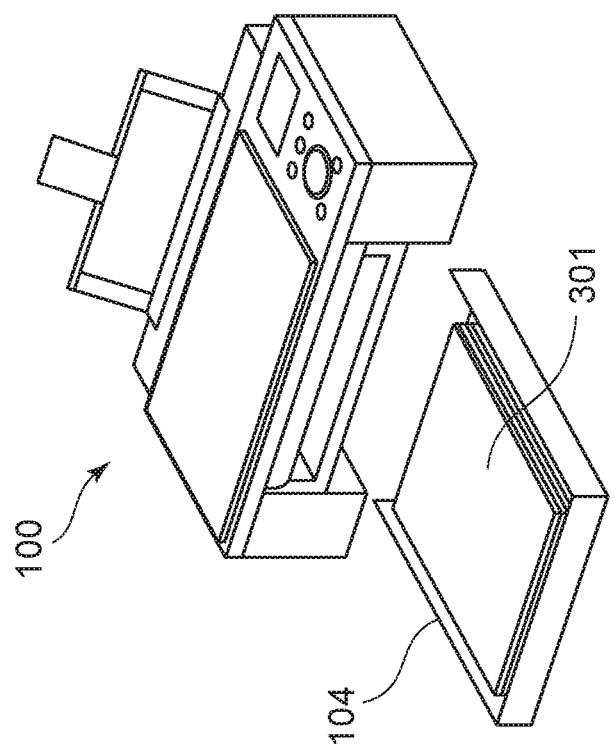

FIGS. 3A and 3B are diagrams for describing an operation performed by the user on the sheet feeding cassette 104. FIG. 3A illustrates a state in which the sheet feeding cassette 104 is detached from the printing apparatus 100, and sheets 301 are sheets loaded in the sheet feeding cassette 104. As illustrated in FIG. 3B, when the user attaches the sheet feeding cassette 104 to the printing apparatus 100, the printing apparatus 100 can feed sheets. The sheet-feeding-cassette operation sensor 209, which is illustrated in FIG. 2, may detect that the state has changed from the state illustrated in FIG. 3A in which the sheet feeding cassette 104 is detached to the state illustrated in FIG. 3B in which the sheet feeding cassette 104 is attached by an operation.

FIGS. 4A and 4B are diagrams for describing an operation performed by the user on the rear tray 105. FIG. 4A illustrates a state in which no sheet is loaded on the rear tray 105, and FIG. 4B illustrates a state in which sheets 401 are loaded on the rear tray 105. The rear-tray operation sensor 210, which is illustrated in FIG. 2, may detect that the state has changed from the state illustrated in FIG. 1A in which no sheet is loaded to the state illustrated in FIG. 4B in which the sheets 401 are loaded on the rear tray 105.

FIG. 5 is a diagram for describing feeding unit information indicating a feeding unit operated by the user. In addition, a table illustrated in FIG. 5 is stored in advance in the data holding unit 207, and a value 501 corresponding to feeding unit information 502 is defined in the table. For example, "1" and "2" as the value 501 respectively indicate that the sheet feeding cassette 104 and the rear tray 105 are operated. In addition, "0" as the value 501 indicates that, after the power of the printing apparatus 100 was turned on, the sheet feeding cassette 104 or the rear tray 105 has not been operated yet.

In the present embodiment, the value 501 illustrated in FIG. 5 is stored in the data holding unit 207 as information indicating the feeding unit that the user has last operated. When the user operates a feeding unit different from a feeding unit corresponding to the value 501 stored in the data holding unit 207, the value 501 is updated. Until the power of the printing apparatus 100 is turned on and either the sheet feeding cassette 104 or the rear tray 105 is operated, "0" corresponding to "undetected" serving as the feeding unit information 502 is stored in the data holding unit 207.

Figure 8:
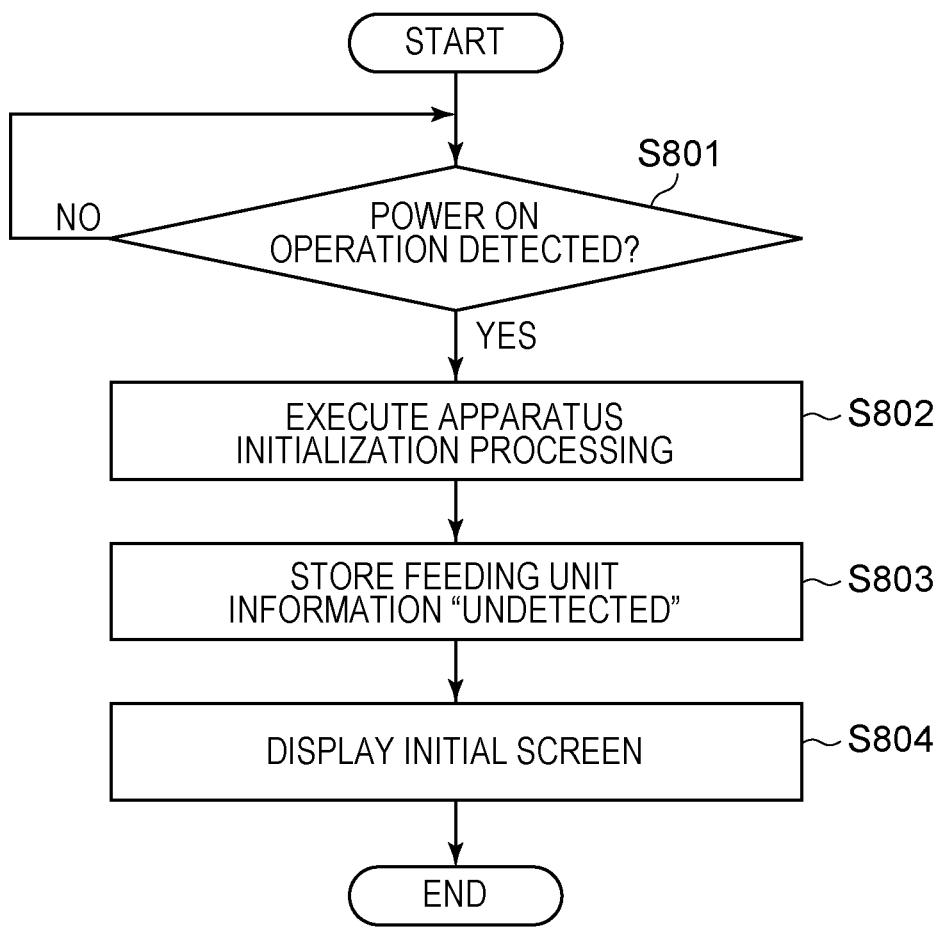
FIG. 8 is a flowchart in response to turning on the power of the printing apparatus.

FIG. 8 is a flowchart illustrating the operation in response to turning on the power of the printing apparatus. Note that the processing in each of the steps of the flowcharts illustrated in FIG. 8 and later-described FIGS. 6, 10, 12, 13, 15, and 18 is executed by the CPU 206. Specifically, a program corresponding to the processing in each step is stored in the ROM in the data holding unit 207. When the CPU 206 executes the program using the RAM in the data holding unit 207 as work memory, the processing in each step is executed.

A process illustrated in FIG. 8 starts in a state in which the printing apparatus 100 is connected to an alternating current (AC) power supply. At first, the CPU 206 determines whether an operation of turning on the power of the printing apparatus 100 has been performed (S801). For example, whether a power button included in the operation buttons 102 has been pressed is determined. In the case where an operation of turning on the power has not been performed (NO in S801), the processing in S801 is executed again. That is, as long as the printing apparatus 100 is connected to an AC power supply, the processing in S801 is repeatedly executed until the power of the printing apparatus 100 is turned on.

In the case where an operation of turning on the power has been performed (YES in S801), the CPU 206 executes initialization processing of the printing apparatus 100 (S802). Furthermore, the CPU 206 stores the value "0" indicating the feeding unit information "undetected" in the data holding unit 207. Note that the data holding unit 207 may be provided with a specific storage area where feeding unit information is stored as information indicating the feeding unit that the user has last operated. In S803, the CPU 206 stores the value "0" indicating "undetected" in the specific storage area. The CPU 206 displays an initial screen on the liquid crystal panel 101 (S804). On the initial screen, the user may select the copy function. In response to selection of the copy function, a copy command receiving screen is displayed. The copy command receiving screen will be described in detail later using FIG. 9. Note that the copy command receiving screen may be displayed as the above-mentioned initial screen.

Figure 6:
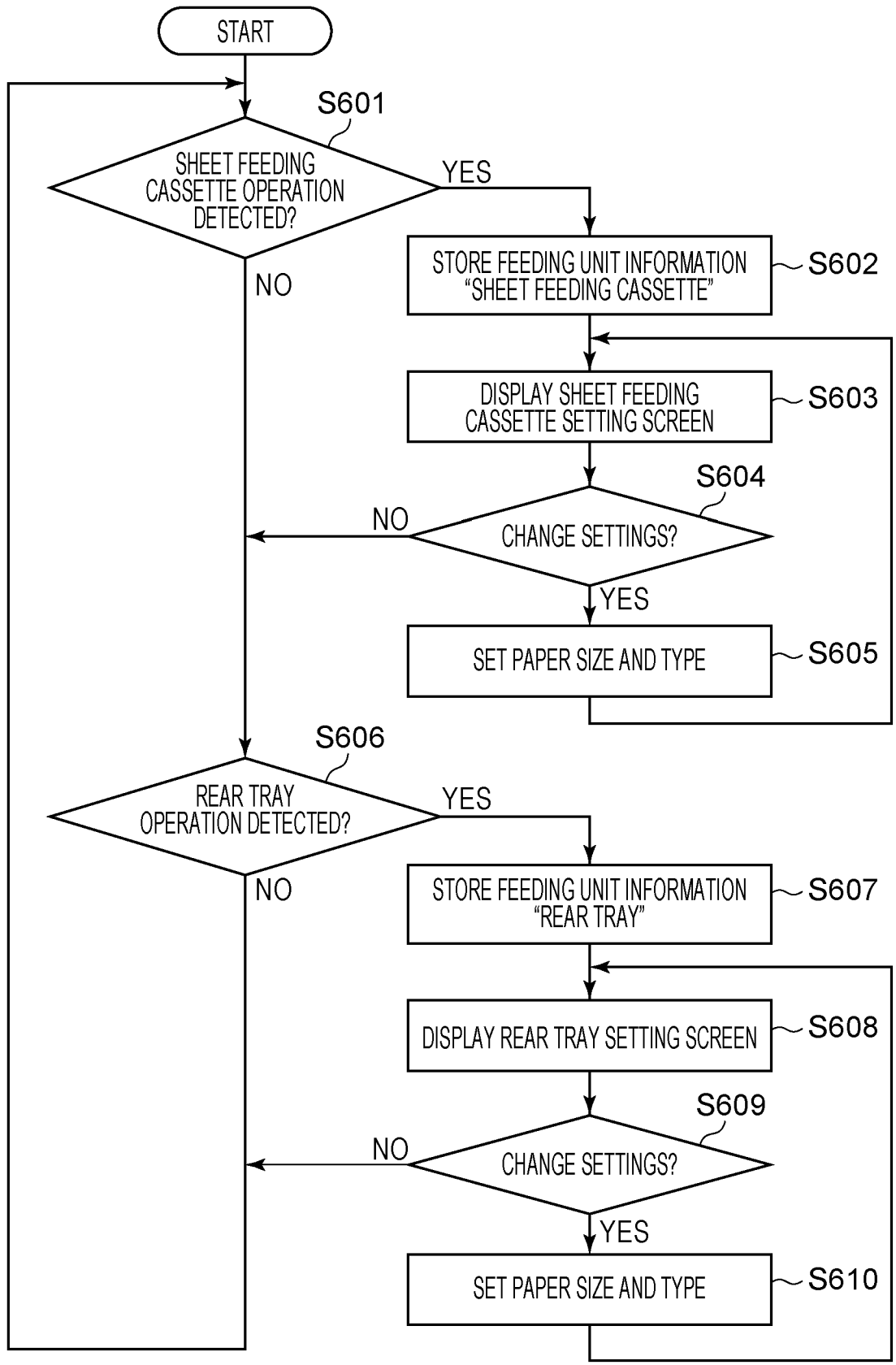
FIG. 6 is a flowchart illustrating a feeding unit information updating process.

FIG. 6 is a flowchart illustrating a feeding unit information updating process. The process illustrated in FIG. 6 starts in response to an end of the process illustrated in FIG. 8, and is executed until the power of the printing apparatus 100 is turned off.

The CPU 206 determines whether an operation on the sheet feeding cassette 104 has been detected by the sheet-feeding-cassette operation sensor 209 (S601). Specifically, the sheet-feeding-cassette operation sensor 209 detects that, as illustrated in FIGS. 3A and 3B, the state has changed from the state in which the sheet feeding cassette 104 is detached to the state in which the sheet feeding cassette 104 is attached. That is, in S601, whether an operation of attaching the sheet feeding cassette 104 to the printing apparatus 100 has been performed is determined. Note that the sheet-feeding-cassette operation sensor 209 regularly determines whether the above-mentioned operation has been performed on the sheet feeding cassette 104 when the power of the printing apparatus 100 is on. In response to determination that this operation has been performed, information (such as a flag) indicating the determination result is stored in the data holding unit 207. In S601, whether this information (such as a flag) is stored in the data holding unit 207 is determined.

In response to determination that an operation on the sheet feeding cassette 104 has been performed (YES in S601), the CPU 206 stores the feeding unit information "sheet feeding cassette" in the above-mentioned specific storage area of the data holding unit 207 (S602). That is, information indicating that the feeding unit that the user has last operated is the sheet feeding cassette 104 is stored in the data holding unit 207. Next, the CPU 206 displays a sheet feeding cassette setting screen illustrated in FIG. 7A on the liquid crystal panel 101 (S603). When the processing in S603 is performed, the CPU 206 deletes the above-mentioned information (such as a flag) indicating that an operation on the sheet feeding cassette 104 has been performed from the data holding unit 207.

Figure 7A:
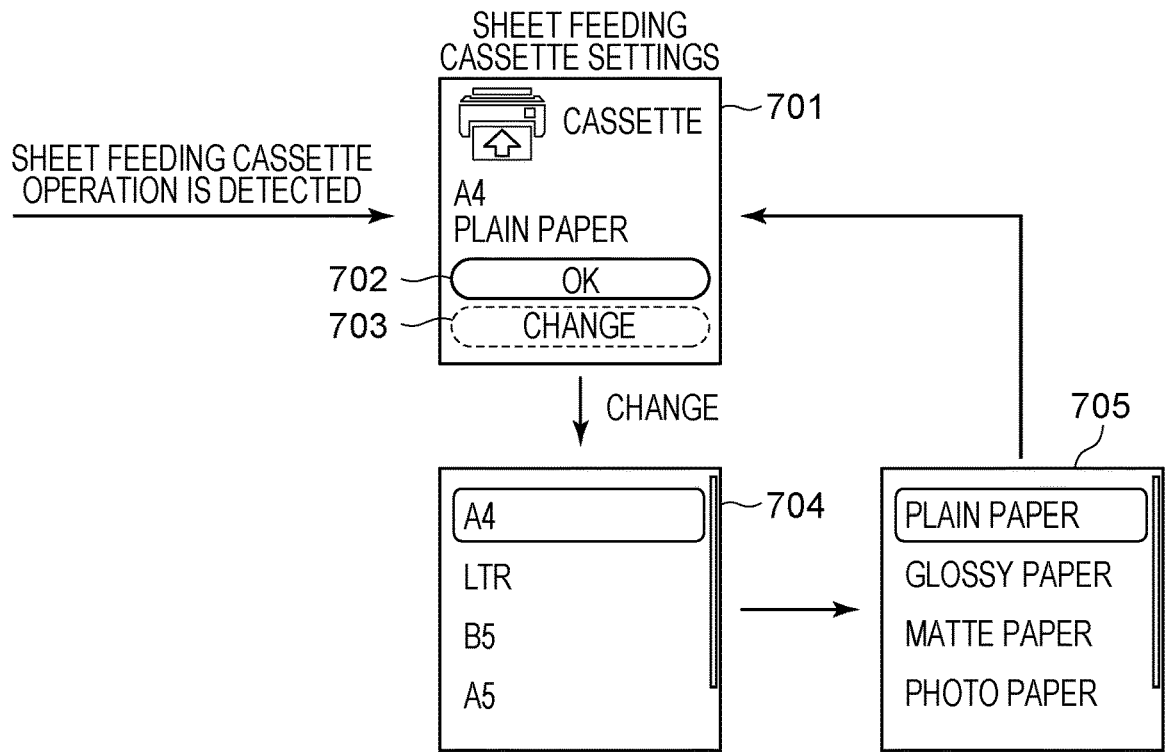
FIGS. 7A and 7B are diagrams illustrating a display screen in response to an operation on a feeding unit of the printing apparatus.
Figure 7B:
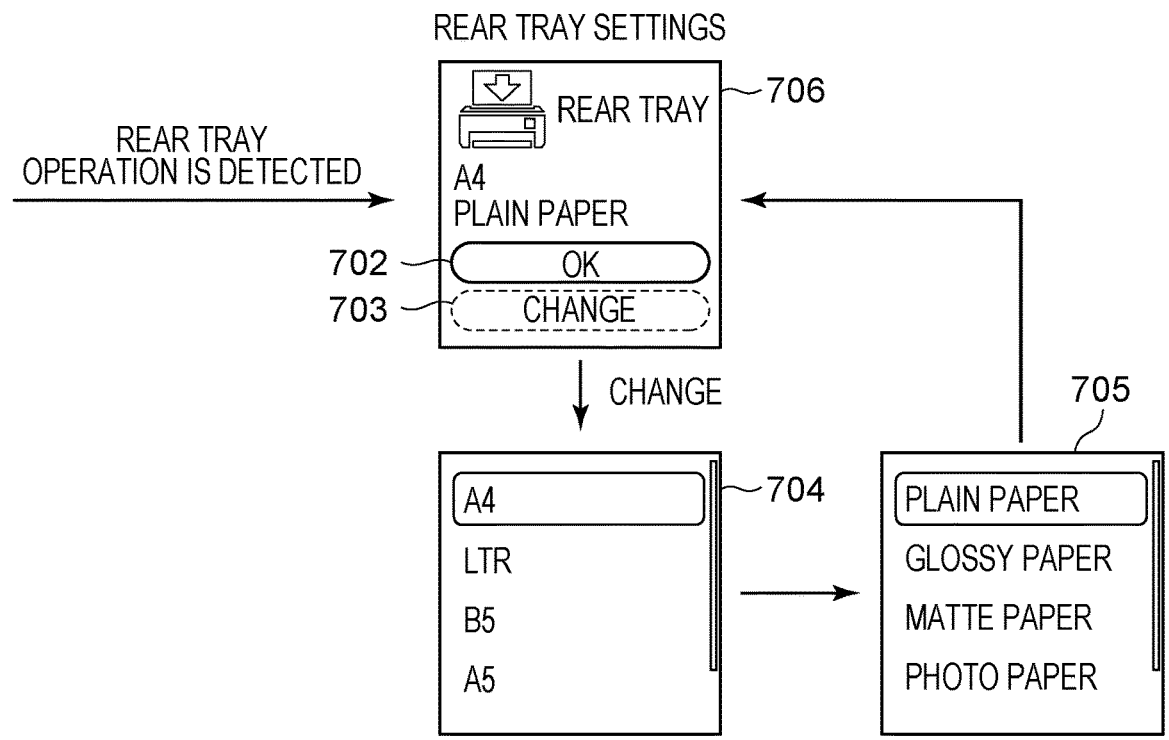

FIGS. 7A and 7B are diagrams each illustrating a screen displayed on the liquid crystal panel 101 when an operation is performed on a feeding unit. FIG. 7A illustrates a display example in the case where an operation on the sheet feeding cassette 104 has been detected, and, in S603, a sheet feeding cassette setting screen 701 is displayed. On the sheet feeding cassette setting screen 701, sheet feeding cassette settings (paper size and paper type) held in the non-volatile memory in the data holding unit 207 are displayed. As will be described later, the user may designate a feeding unit used for printing in copying. As print settings of printing at the time of copying, the sheet feeding cassette settings (paper size and paper type) displayed on the sheet feeding cassette setting screen 701 are applied. That is, the sheet feeding cassette setting screen 701 indicates print settings in the case where the sheet feeding cassette 104 is designated.

Note that the sheet feeding cassette setting screen 701 includes an OK button 702 and a change button 703 as two options selectable by the user. In S604, the CPU 206 determines whether the user has selected the OK button 702 or the change button 703 included in the sheet feeding cassette setting screen 701 (S604). In response to determination that the change button 703 has been selected (YES in S604), the CPU 206 sets the sheet feeding cassette settings (paper size and paper type). Specifically, in S605, the CPU 206 displays a paper size selecting screen 704 and a paper type selecting screen 705, which are illustrated in FIG. 7A, on the liquid crystal panel 101. The user may set, respectively on the paper size selecting screen 704 and the paper type selecting screen 705, a desired paper size and a desired paper type as the sheet feeding cassette settings. By selecting settings different from the sheet feeding cassette settings displayed on the sheet feeding cassette setting screen 701, the user may change the sheet feeding cassette settings. As a sheet feeding cassette setting procedure, for example, after the user designates the paper size on the paper size selecting screen 704, the paper type selecting screen 705 is displayed. The procedure is not limited to this, and both the paper size selecting screen 704 and the paper type selecting screen 705 may be displayed on the liquid crystal panel 101. When the user sets the paper size and the paper type, the process illustrated in FIG. 6 proceeds to S603, and the sheet feeding cassette setting screen 701 is displayed again on the liquid crystal panel 101.

In the case where no operation on the sheet feeding cassette 104 is detected in S601, or in response to determination in S604 that the OK button 702 included in the sheet feeding cassette setting screen 701 has been selected, the determination processing in S606 is executed.

In S606, the CPU 206 determines whether an operation on the rear tray 105 has been detected by the rear-tray operation sensor 210. Specifically, the rear-tray operation sensor 210 detects that, as illustrated in FIGS. 4A and 4B, the sheets 401 have been loaded on the rear tray 105. That is, in S606, whether the user has performed an operation of loading the sheets 401 on the rear tray 105 is determined. Note that the rear-tray operation sensor 210 regularly determines whether the above-mentioned operation on the rear tray 105 has been performed when the power of the printing apparatus 100 is on. In response to determination that the above-mentioned operation has been performed, information (such as a flag) indicating the determination result is stored in the data holding unit 207, like the case of the sheet-feeding-cassette operation sensor 209. In S606, whether that information (such as a flag) is stored in the data holding unit 207 is determined.

In response to determination that an operation on the rear tray 105 has been performed (YES in S606), the CPU 206 stores the feeding unit information "rear tray" in the above-mentioned specific storage area of the data holding unit 207 (S607). That is, information indicating that the feeding unit that the user has last operated is the rear tray 105 is stored in the data holding unit 207. Next, the CPU 206 displays a rear tray setting screen illustrated in FIG. 7B on the liquid crystal panel 101 (S608). When the processing in S608 is performed, the CPU 206 deletes the above-mentioned information (such as a flag) indicating that an operation on the rear tray 105 has been performed from the data holding unit 207.

FIG. 7B illustrates a display example in the case where an operation on the rear tray 105 has been detected, and, in S608, a rear tray setting screen 706 is displayed. On the rear tray setting screen 706, rear tray settings (paper size and paper type) held in the non-volatile memory in the data holding unit 207 are displayed. The rear tray settings indicate print settings of printing at the time of copying, like the above-described sheet feeding cassette settings. Specifically, in the case where the rear tray 105 is designated as a feeding unit used for copying, the rear tray settings (paper size and paper type) displayed on the rear tray setting screen 706 are applied. That is, the rear tray setting screen 706 indicates print settings in the case where the rear tray 105 has been designated. In addition, the rear tray setting screen 706 includes the OK button 702 and the change button 703 as two options selectable by the user, like the sheet feeding cassette setting screen 701.

In S609, the CPU 206 determines whether the user has selected the OK button 702 or the change button 703 included in the rear tray setting screen 706. In response to determination that the change button 703 has been selected (YES in S609), the CPU 206 sets the rear tray settings (paper size and paper type) (S610). Because the setting processing in S610 is similar to the sheet feeding cassette setting processing in S605, a description thereof is omitted.

With the process illustrated in FIG. 6, when the user performs an operation of loading sheets in the sheet feeding cassette 104 or on the rear tray 105, the user may change the print settings corresponding to the operated feeding unit in S605 or S610. Furthermore, in S602 or S607, information indicating the feeding unit that the user has last operated is stored in the data holding unit 207.

As described above, whether an operation on the sheet feeding cassette 104 or the rear tray 105 has been performed is regularly determined when the power of the printing apparatus 100 is on. Therefore, for example, even in the case where the rear tray 105 is operated when the processing in S603 or S605 is being performed, it is determined in S606 that an operation on the rear tray 105 has been performed. Therefore, the processing in S607 is executed, that is, information indicating that the feeding unit that the user has last operated is the rear tray 105 is stored. Similarly, in the case where the sheet feeding cassette 104 is operated when the processing in S608 or S610 is being performed, in S602, information indicating the feeding unit that the user has last operated is the sheet feeding cassette 104 is stored.

In the present embodiment, in the case where the user allows copying to be executed, the user designates a feeding unit used for printing at the time of copying (details will be described later using FIG. 9). The print settings set for the feeding unit designated by the user (sheet feeding cassette settings or rear tray settings) are used as print settings of printing at the time of copying.

In the case where the feeding unit designated by the user is different from the feeding unit that the user has last operated (the feeding unit indicated by information stored in S602 or S607), the CPU 206 displays a checking screen for allowing the user to check the feeding unit used for printing. Therefore, for example, even in the case where the user wrongly designates a feeding unit different from a feeding unit where the user has loaded sheets, or even in the case where, after the user has designated a feeding unit, the user wrongly loads sheets in a feeding unit different from the designated feeding unit, the user may be notified thereof. Displaying of the above-mentioned checking screen will be described later using FIG. 10.

Figure 9:
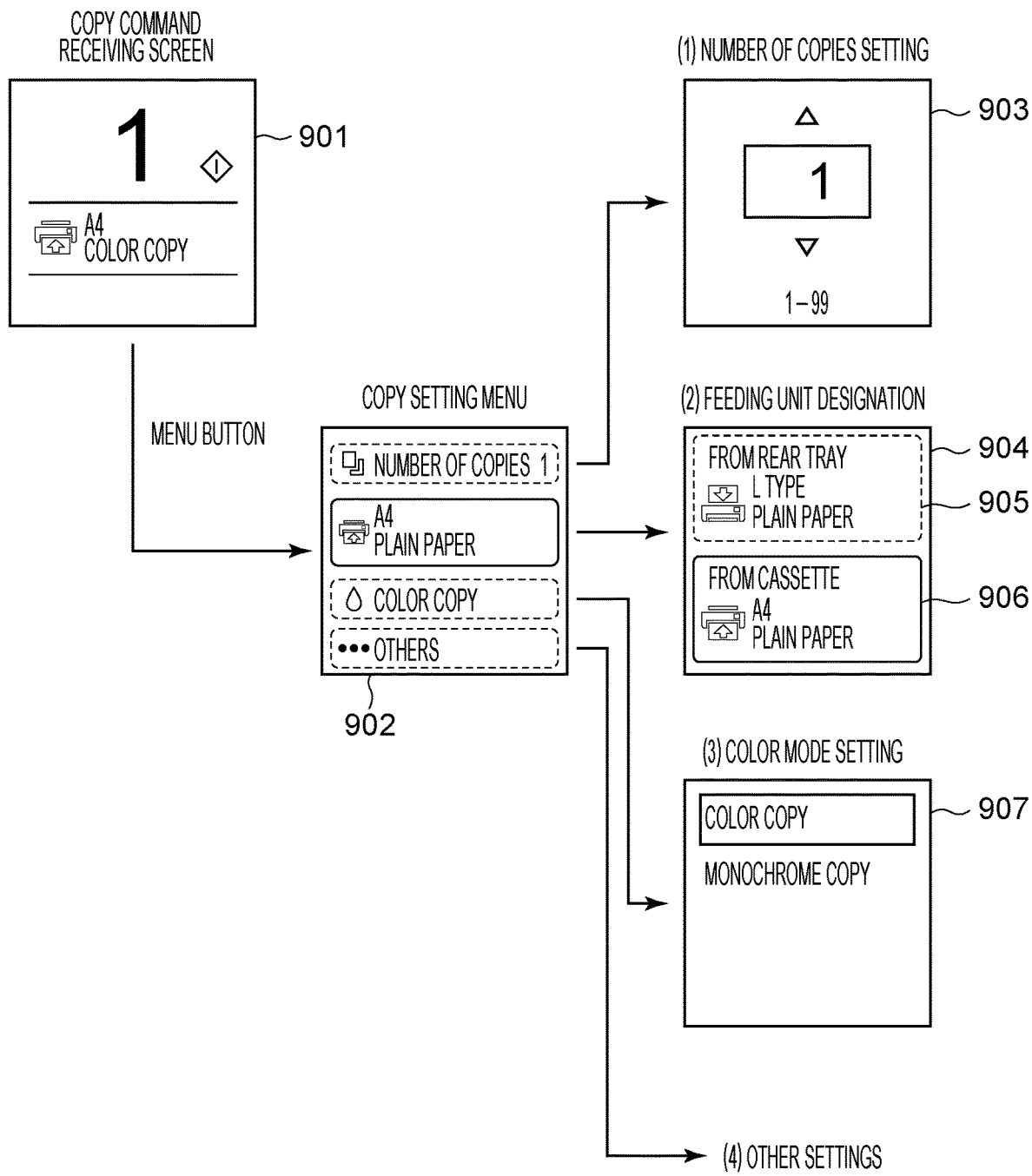
FIG. 9 illustrates a display screen when making copy settings of the printing apparatus.

FIG. 9 is a diagram illustrating a screen displayed when the copy function of the printing apparatus 100 is executed. As described above, when the copy function is selected on the initial screen displayed on the liquid crystal panel 101 of the printing apparatus 100 or when the power of the printing apparatus 100 is turned on, a copy command receiving screen 901 is displayed.

The copy command receiving screen 901 includes the number of copies, the currently selected feeding unit, and print settings (paper size and paper type) corresponding to this feeding unit. In this state, in response to pressing of a copy start button (not illustrated) included in the operation buttons 102, the CPU 206 causes the scanning mechanism 211 to operate to read an original placed on the original platen 103. The CPU 206 causes the printing mechanism 208 to operate to print an image based on image data output from the scanning mechanism 211. At this time, the CPU 206 causes a feeding unit designated upon pressing of the copy start button to feed a sheet, and causes printing to be executed with print settings set to that feeding unit. Specifically, on the basis of image data output from the scanning mechanism 211, the CPU 206 generates an image with a size in accordance with the paper size included in the print settings, and performs image processing in accordance with the paper type included in the print settings. The CPU 206 prints the image generated as above in accordance with parameters in accordance with the paper type included in the print settings. These parameters include a parameter for controlling a mechanism that conveys sheets, and a parameter for adjusting the amount of recording material (ink or toner) applied to sheets.

In addition, in response to pressing of a menu button (not illustrated) included in the operation buttons 102 while the copy command receiving screen 901 is being displayed, the CPU 206 displays a copy setting menu 902 on the liquid crystal panel 101. The copy setting menu 902 provides options corresponding to each of the following: (1) number-of-copy setting, (2) feeding unit designation, (3) color mode setting, and (4) other settings. Then, a screen in accordance with an option selected by the user is displayed on the liquid crystal panel 101. Note that the user may select any of the options by operating the operation buttons 102. Alternatively, in the case where the liquid crystal panel 101 is a touchscreen, the user may select any of the options by touching the liquid crystal panel 101.

In response to selection of (1) number-of-copy setting, the CPU 206 displays a number-of-copy setting screen 903, which allows the user to set the number of copies, on the liquid crystal panel 101. Similarly, in response to selection of (2) feeding unit designation, (3) color mode setting, and (4) other settings, the CPU 206 displays a feeding unit designating screen 904, a color mode setting screen 907, and another settings screen (not illustrated), respectively, on the liquid crystal panel 101.

On the color mode setting screen 907, the user may select color copy or monochrome copy as the color mode used for reading an original and for printing. On the other settings screen, the user may make various settings, such as enlargement or reduction ratio of a scanned image at the time of copying, density at the time of printing, the number of pages assigned to one sheet, and designation of double-sided copying.

On the feeding unit designating screen 904, two options corresponding respectively to the sheet feeding cassette 104 and the rear tray 105 are presented. The feeding unit designating screen 904 indicates print settings (paper size and paper type) corresponding to each of the sheet feeding cassette 104 and the rear tray 105. By selecting one of the two options included in the feeding unit designating screen 904, the user may designate a desired feeding unit as a feeding unit used for printing at the time of copying. By moving the cursor within the screen using, for example, the operation buttons 102, the user may change the feeding unit used for printing at the time of copying. In response to the user's designation of the feeding unit, print settings are determined, in addition to the to-be-used feeding unit. Therefore, the user may easily designate the feeding unit and make print settings.

Note that, for example, the feeding unit designating screen 904 is configured not to allow the user to change the print settings (paper size and paper type) corresponding to each feeding unit. In this case, the user may change the print settings by operating the sheet feeding cassette 104 or the rear tray 105 again to display the screen illustrated in FIG. 7A or 7B again. Such a configuration may reduce the case of making print settings different from the size and type of sheets that are actually fed, and printing images with a size unsuitable for the actual sheets, or the case of printing images with parameters unsuitable for the actual sheets. For example, in the case of making print settings in response to an operation performed on a feeding unit, print settings may be made when sheets that are to be actually used are loaded. Therefore, with such settings, compared with the case of making print settings on the feeding unit designating screen 904, print settings suitable for the actual sheets may be made. Thus, the feeding unit designating screen 904 is configured such that print settings (paper size and paper type) corresponding to each feeding unit are unchangeable.

Note that such a configuration is only one example, and the feeding unit designating screen 904 may be configured such that print settings (paper size and paper type) corresponding to each feeding unit are changeable.

As described above, after the number-of-copy setting screen 903, the feeding unit designating screen 904, the color mode setting screen 907, or the other settings screen (not illustrated) is displayed, the user gives a command to end the setting using the operation buttons 102. In response to this, the copy setting menu 902 is displayed again on the liquid crystal panel 101. When the user further gives a command to end the setting using the operation buttons 102, the copy command receiving screen 901 is displayed again on the liquid crystal panel 101.

Figure 10:
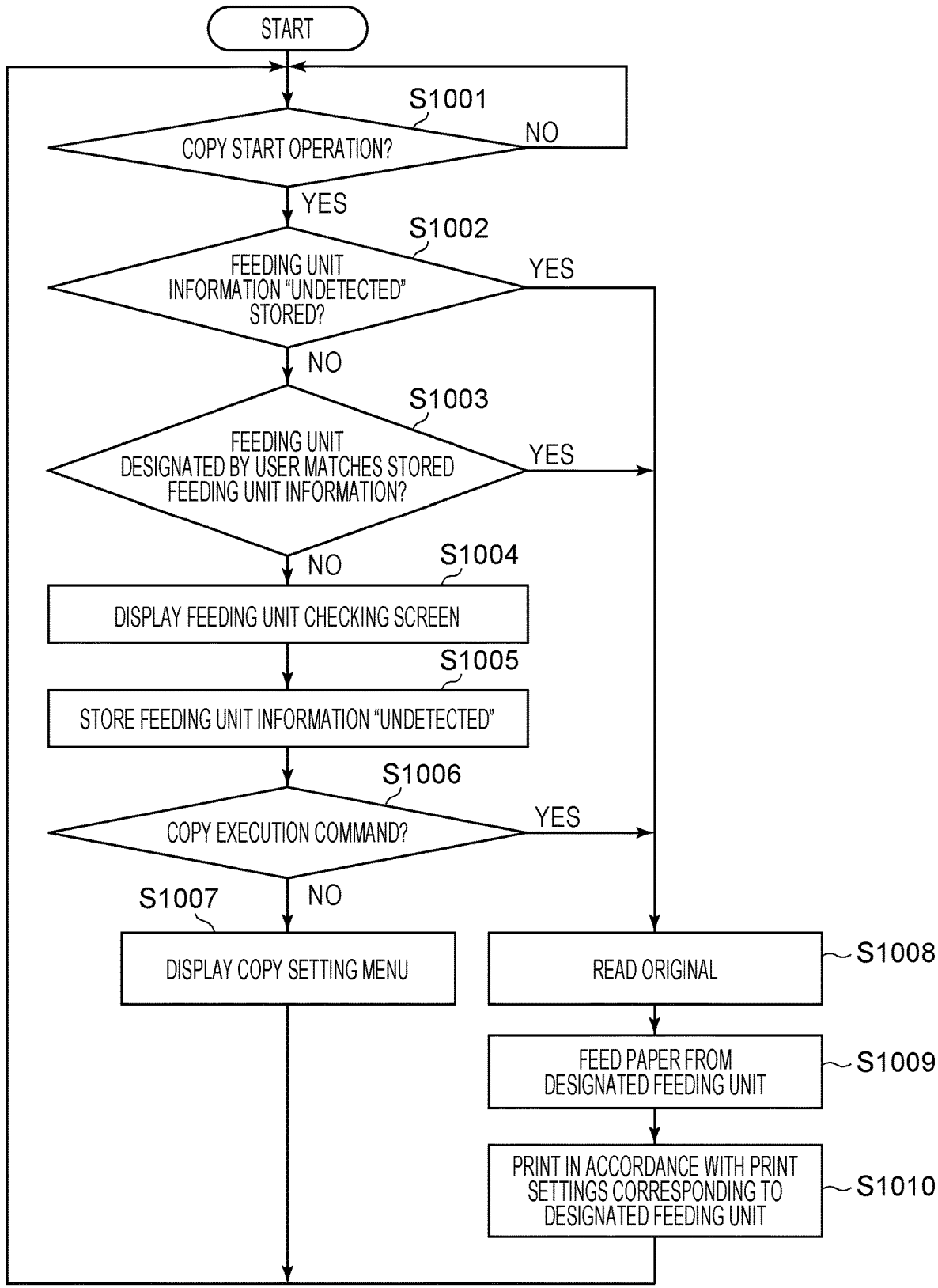
FIG. 10 is a flowchart of the operation in response to starting of copying of the printing apparatus.
Figure 11:
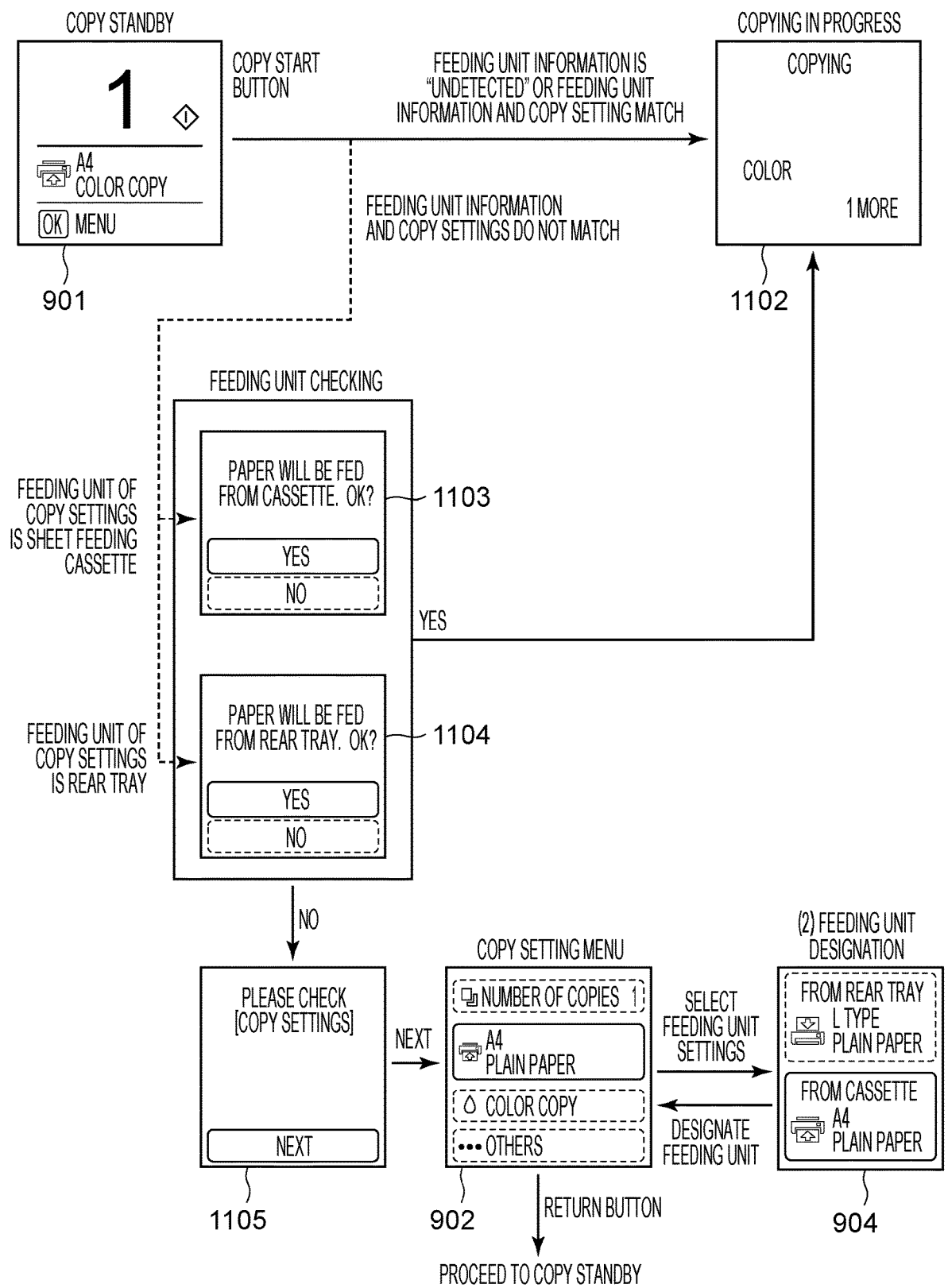
FIG. 11 illustrates a display screen in response to starting of copying of the printing apparatus.

FIG. 10 is a flowchart illustrating the operation in response to starting of copying of the printing apparatus 100. FIG. 11 is a diagram illustrating a screen displayed on the liquid crystal panel 101 when the copy function of the printing apparatus 100 is executed. Note that the process of the flowchart illustrated in FIG. 10 starts in the case where the copy command receiving screen 901 illustrated in FIG. 9 is displayed on the liquid crystal panel 101. In the case where the initial screen is displayed again or a command for functions other than the copy function is given, the process illustrated in FIG. 10 ends.

The CPU 206 determines whether an operation to start copying has been performed on the copy command receiving screen 901 illustrated in FIG. 11 (a copy start button included in the operation buttons 102 has been pressed) (S1001). Note that the determination processing in S1001 is continued when the copy setting menu 902, the number-of-copy setting screen 903, the feeding unit designating screen 904, or the color mode setting screen 907, which are illustrated in FIG. 9, or the other settings screen (not illustrated) is displayed on the liquid crystal panel 101. In addition, the determination processing in S1001 is interrupted when the sheet feeding cassette 104 or the rear tray 105 is operated by the user to display the screen illustrated in FIG. 7A or 7B. When the screen illustrated in FIG. 9 is displayed again, the determination processing in S1001 is executed again.

In S1002, the CPU 206 determines whether the feeding unit information "undetected" is stored in the above-mentioned specific storage area where information indicating the feeding unit that the user has last operated is stored. That is, in S1002, whether a feeding unit has been operated after the power of the printing apparatus 100 was turned on is determined. In the case where "sheet feeding cassette" or "rear tray" is stored in the above-mentioned specific storage area, the process proceeds to S1003.

In S1003, the CPU 206 determines, as described above using FIG. 9, whether the feeding unit designated as a copy setting matches the feeding unit indicated by feeding unit information stored in the above-mentioned specific storage area. That is, in S1003, whether the feeding unit that the user has last operated is designated as a copy setting is determined.

In the case where it is not determined that the feeding unit that the user has last operated is designated as a copy setting (NO in S1003), the process proceeds to S1004.

In S1004, the CPU 206 displays a feeding unit checking screen for prompting the user to check the feeding unit designated as a copy setting on the liquid crystal panel 101.

The feeding unit checking screen displayed in S1004 includes information indicating a feeding unit designated as a copy setting. Different screens are displayed between the case where the sheet feeding cassette 104 is designated as a copy setting and the case where the rear tray 105 is designated as a copy setting. A checking screen 1103 illustrated in FIG. 11 is a feeding unit checking screen displayed in the case where, while the sheet feeding cassette 104 is designated as a copy setting, the feeding unit that the user has last operated is the rear tray 105. The checking screen 1103 includes text indicating that the feeding unit used for copying is the sheet feeding cassette, and, from this text, the user may confirm that the sheet feeding cassette is designated as a copy setting. Similarly, a checking screen 1104 is a feeding unit checking screen displayed in the case where, while the rear tray 105 is designated as a copy setting, the feeding unit that the user has last operated is the sheet feeding cassette 104.

Note that various screens may be displayed as the feeding unit checking screen. For example, the feeding unit checking screen may include both or either of information indicating a feeding unit designated as a copy setting and information indicating the feeding unit that the user has last operated. Alternatively, the above information may not be included, and a message such as "The feeding unit set as a copy setting is different from the last-operated feeding unit" may be displayed as the feeding unit checking screen.

The CPU 206 displays the feeding unit checking screen in S1004, and stores the feeding unit information "undetected" in the above-mentioned specific storage area in S1005. Therefore, until a feeding unit is operated again, control is performed not to display the feeding unit checking screen again in S1004 when an operation to start copying is performed (YES in S1001) and the determination processing in S1002 is executed. For example, after the feeding unit checking screen is displayed once, when the user recognizes that the copy setting does not match the last-operated feeding unit, if an operation to start copying is performed in S1001, the feeding unit checking screen is prevented from being displayed again.

In S1006, the CPU 206 determines whether the user has given a copy command on the feeding unit checking screen. Specifically, it is determined whether a "yes" button or a "no" button has been selected on the checking screen 1103 or 1104 in FIG. 11.

In the case where it is determined in S1006 that the "yes" button has been selected by the user on the feeding unit checking screen, the process proceeds to S1008. In S1008, the CPU 206 executes reading control, thereby causing the scanning mechanism 211 to read an original placed on the original platen 103. In S1009 and S1010 the CPU 206 performs printing control to cause the printing mechanism 208 to print a scanned image obtained in S1008. Specifically, in S1009, the CPU 206 causes the printing mechanism 208 to feed a sheet from a feeding unit designated in the copy settings. In S1010, the CPU 206 causes the printing mechanism 208 to print a scanned image obtained in S1008 on the sheet fed in S1009. Note that, in S1009, printing is executed in accordance with print settings set by the process illustrated in FIG. 6 for a feeding unit designated in the copy settings. Specifically, the CPU 206 generates an image with a size in accordance with the paper size included in the print settings, and performs image processing in accordance with the paper type included in the print settings. The CPU 206 causes the printing mechanism 208 to print the image generated as above in accordance with parameters in accordance with the paper type included in the print settings. These parameters include a parameter for controlling a mechanism that conveys sheets, and a parameter for adjusting the amount of recording material (ink or toner) applied to sheets.

With the processing in S1008 to S1010 described above, copying is executed. Note that a copying-in-progress screen 1102 illustrated in FIG. 11 is displayed on the liquid crystal panel 101 in S1008 to S1010. In response to completion of the processing in S1010, the copy command receiving screen 901 is displayed again.

In response to selection of the "no" button on the feeding unit checking screen, the process proceeds to S1007. In S1007, the CPU 206 displays the copy setting menu 902 on the liquid crystal panel 101. S1007 will be described in detail using FIG. 11. In S1007, the CPU 206 first displays a checking screen 1105. In response to selection of a "next" button on the checking screen 1105, the CPU 206 displays the copy setting menu 902. As described using FIG. 9, in response to selection of feeding unit settings on the copy setting menu 902, the feeding unit designating screen 904 is displayed. In response to designation of a feeding unit on the feeding unit designating screen 904, the copy setting menu 902 is displayed again. When the user presses a return button included in the operation buttons 102 while the copy setting menu 902 is being displayed, the receiving screen 901 is displayed again.

With the process illustrated in FIG. 10, in the case where a feeding unit designated as a copy setting when a copy start command is executed is different from the feeding unit that the user has last operated, the above-mentioned feeding unit checking screen is displayed. Accordingly, the user may check a feeding unit designated as a copy setting or check that this feeding unit does not match the last-operated feeding unit. Therefore, for example, in the case where, after loading sheets on a desired feeding unit, the user forgets the designated feeding unit and gives a command to start copying, unintended copying is prevented, and the user may be prompted to correct the copy settings.

Although the present embodiment describes an example of printing at the time of executing copying, the present embodiment is not limited to printing at the time of copying. For example, the processing in the above-described embodiment may be executed in the case where the printing apparatus 100 prints an image received from an external apparatus via the wireless LAN unit 212 or the USB unit 213. In that case, in FIG. 10, it is determined in S1001 whether a to-be-printed image has been received from an external apparatus, and reading of an original in S1008 is not executed.

Although the present embodiment describes an exemplary printing apparatus including two feeding units, the printing apparatus is not limited to this configuration and may include three or more feeding units.

Furthermore, although the present embodiment has described, as exemplary operations on feeding units detected by sensors, attachment of the sheet feeding cassette 104 to the printing apparatus 100 and loading of sheets on the rear tray 105, the details of operations and the operation detecting method are not limited thereto. For example, an operation of closing a lid provided on each feeding unit or pressing of a button provided corresponding to each feeding unit may be detected as an operation. In addition, as a detecting method of detecting that sheets have been loaded, pushing down of a lever provided on a feeding unit as a result of loading sheets may be detected, or approach of a finger or sheets to a sensor provided near a feeding unit may be detected.

With such detection results, the feeding unit that the user has last operated may be estimated. That is, in the case where the user loads sheets immediately before giving a command to start copying, a feeding unit where the sheets are loaded may be identified.

In the present embodiment, the copy setting menu 902 is displayed when "no" is selected on the feeding unit checking screen illustrated in FIG. 11. Moreover, the user checks a feeding unit designated as a copy setting, and, if necessary, designates another feeding unit. However, the configuration is not limited to the above, and alternatively, at a time point at which "no" is selected on the feeding unit checking screen, designation of a feeding unit designated as a copy setting may be automatically switched to another feeding unit.

Furthermore, in the above-described embodiment, when the power of the printing apparatus 100 is turned on, "undetected" is stored in the specific storage area as feeding unit information indicating the feeding unit that the user has last operated. However, the configuration is not limited to the above; and the above-mentioned feeding unit information may be stored in volatile memory, and, when power is turned on, whether the feeding unit information is stored may be determined. Alternatively, feeding unit information may be held in non-volatile memory, and, when power is turned on, storage of "undetected" as above need not be performed. That is, an operation performed by the user on a sheet feeding unit immediately before power is turned off may be used for determining whether to display the feeding unit checking screen.

In the above-described embodiment, the feeding unit setting screen illustrated in FIG. 7A or 7B is displayed upon detection of an operation on each feeding unit, and the user sets a paper size and a paper type as print settings corresponding to the feeding unit. However, the configuration is not limited to the above, and alternatively, one or both of a paper size and a paper type may be automatically detected by a sensor, thus reducing the number of setting items of print settings set by the user, or the feeding unit setting screen may not be displayed.

Note that print settings set by the user or the sensor are reflected not only in printing upon copying, but also in printing an image received from an external apparatus via the wireless LAN unit 212 or the USB unit 213. However, a feeding unit designated as a copy setting need not be reflected in printing an image received from an external apparatus. That is, a feeding unit may be designated in accordance with print settings received from an external apparatus, or a feeding unit corresponding to a paper size and a paper type included in print settings may be automatically selected.

In addition, a feeding unit used for printing from an external apparatus need not be reflected in setting a feeding unit in copy settings. That is, even when a feeding unit different from a feeding unit designated as a copy setting is used for printing from an external apparatus, the copy setting is not updated. For example, it is assumed that the feeding unit of the copy settings is automatically switched in response to a feeding unit used for printing from an external apparatus. In this case, for example, it is assumed that photo paper is loaded in or on a certain feeding unit, and an external apparatus such as a personal computer designates that feeding unit to execute printing. At this time, the feeding unit of the copy settings is the feeding unit where photo paper is loaded. After that, in the case of copying a document, the user may not recognize the feeding unit of the copy settings, and the document may be unintentionally copied on photo paper. To this end, as described above, a feeding unit used for printing from an external apparatus is configured not to be reflected in feeding unit settings of the copy settings, thereby preventing such unintended printing.

Second Embodiment

In FIG. 6, in response to an operation performed on a feeding unit, feeding unit information indicating the feeding unit where the user has last loaded sheets is stored. In a second embodiment, an example will be described in which, further in the case where a feeding unit is selected on a feeding unit selecting screen displayed on the liquid crystal panel 101, feeding unit information on the feeding unit where the user has last loaded sheets is stored.

Note that the printing apparatus 100 has the configuration described in the first embodiment. That is, as illustrated in FIG. 6, feeding unit information is stored additionally upon detection of an operation performed by the user on a feeding unit. Thus, in the case where a feeding unit different from a feeding unit of feeding unit information stored at that time is operated, or in the case where that different feeding unit is selected on the feeding unit selecting screen, the feeding unit information is updated.

Figure 13:
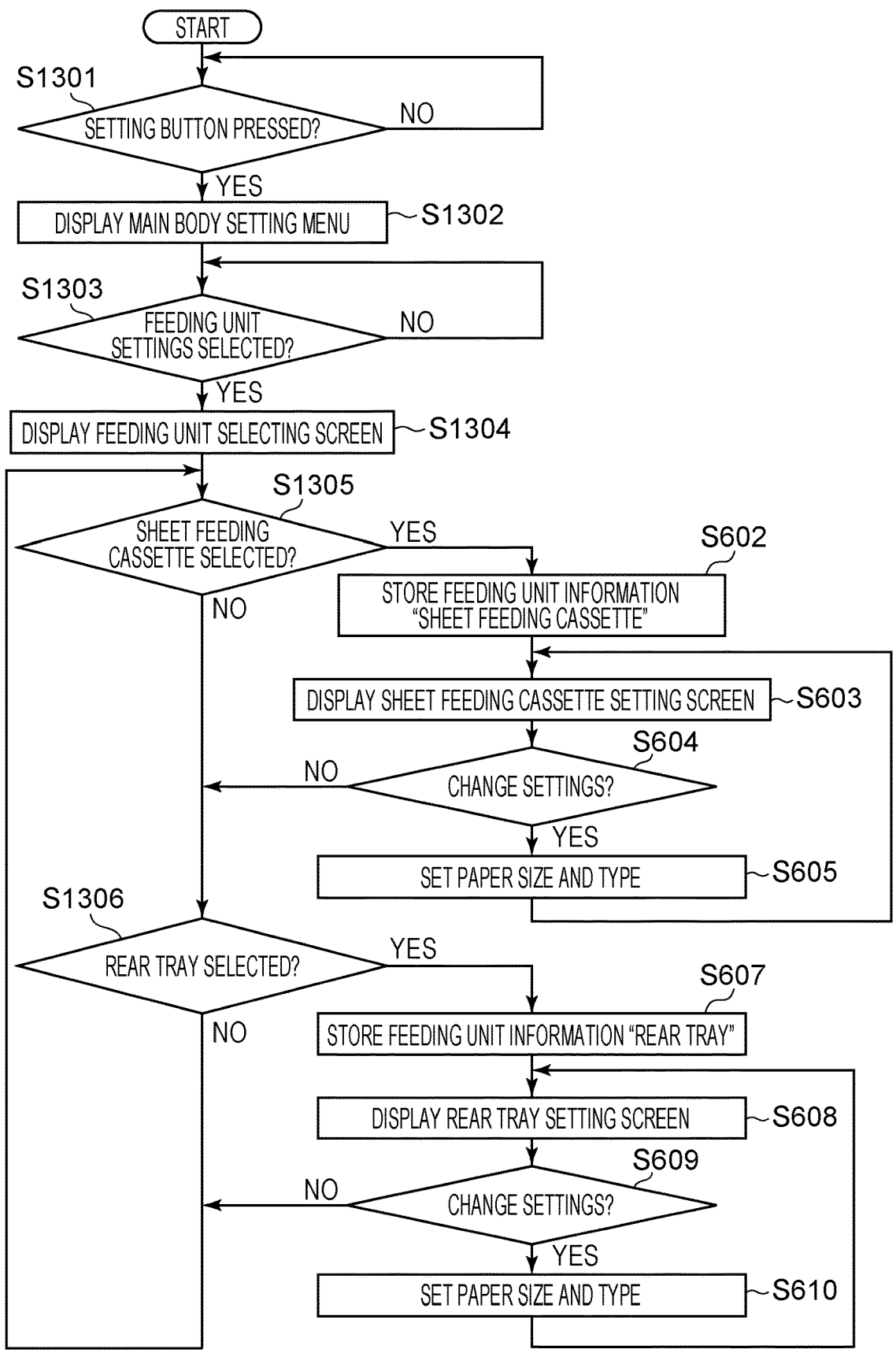
FIG. 13 is a flowchart of the operation of the printing apparatus in response to an operation performed on a feeding unit selecting screen.
Figure 14:
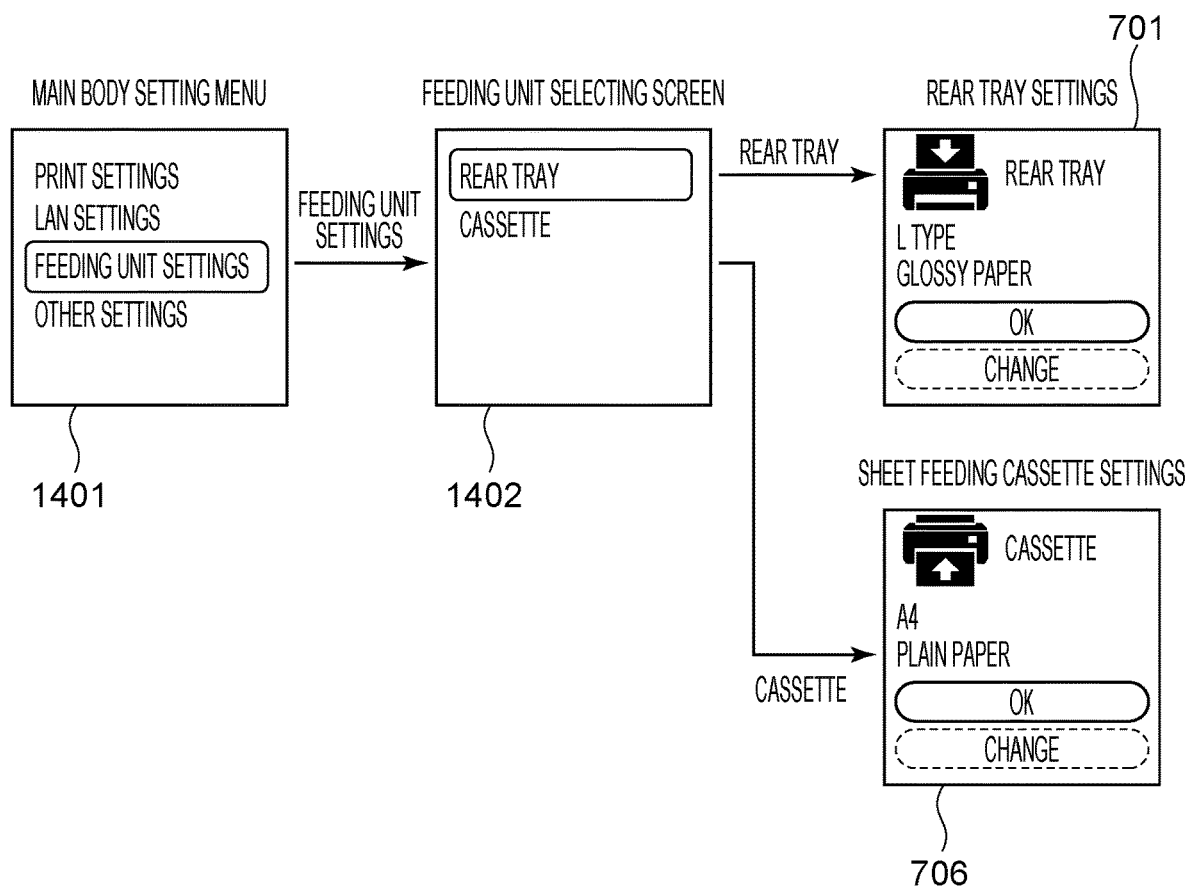
FIG. 14 is a display screen when setting a feeding unit from a menu screen.

FIG. 13 is a flowchart for describing a process in response to an operation performed on the feeding unit selecting screen. FIG. 14 is a diagram illustrating a screen displayed on the liquid crystal panel 101 upon execution of the process of the flowchart illustrated in FIG. 13.

The CPU 206 determines whether a setting button (not illustrated) included in the operation buttons 102 has been pressed (S1301). In response to pressing of the setting button (YES in S1301), the CPU 206 displays a main body setting menu 1401 on the liquid crystal panel 101 (S1302).

As illustrated in FIG. 14, various setting items are displayed on the main body setting menu 1401. Specifically, buttons corresponding to "print settings" for making settings regarding control of the printing mechanism 208, "LAN settings" for making settings regarding control of the wireless LAN unit 212, "feeding unit settings" for making paper settings of each feeding unit, and "other settings" for making various other settings are displayed.

The CPU 206 determines whether feeding unit settings have been selected on the main body setting menu 1401 (S1303), and, in response to selection of feeding unit settings, displays a feeding unit selecting screen 1402 on the liquid crystal panel 101 (S1304).

The CPU 206 determines whether "cassette" has been selected on the selecting screen 1402, S1305). In response to selection of "cassette", the process proceeds to S602. Since the processing in S602 to S605 is the same as that illustrated in FIG. 6, a description thereof is omitted.

If "cassette" has not been selected on the selecting screen 1402, the CPU 206 determines whether "rear tray" has been selected on the selecting screen 1402 (S1306). In response to selection of "rear tray", the process proceeds to S607. Since the processing in S607 to S610 is the same as that illustrated in FIG. 6, a description thereof is omitted.

If it is not determined in S1306 that "rear tray" has been selected, the process returns to S1305.

Note that the process of the flowchart illustrated in FIG. 13 ends when the user presses a home button (not illustrated) or a return button (not illustrated) included in the operation buttons 102.

With the process illustrated in FIG. 13, a feeding unit may be set even with an operation performed by the user on the liquid crystal panel 101. That is, a feeding unit may be set without the user having to load sheets. With storage of feeding unit information, a feeding unit for which settings are made is determined as a feeding unit desired by the user. Therefore, in the case where, after the user selects the feeding unit settings of the rear tray on the selecting screen 1402, a copy command is given in a state where the feeding unit of copy settings is the sheet feeding cassette, the feeding unit checking screen (1103 or 1104) is displayed. Accordingly, forgetting to switch the feeding unit setting at the time of copying may be prevented.

Third Embodiment

As described with reference to FIGS. 8 and 10, "undetected" is stored as feeding unit information after the power of the printing apparatus 100 is turned on. In response to an operation performed by the user on a feeding unit or selection of a feeding unit on the selecting screen, the feeding unit information is appropriately updated.

In a third embodiment, a process of preventing the checking screen 1103 or 1104 from being displayed by changing the feeding unit information back to "undetected" after a specific time has elapsed since the feeding unit information changed to information other than "undetected" will be described. Note that the printing apparatus 100 has the configuration described in the first and second embodiments.

Figure 15:
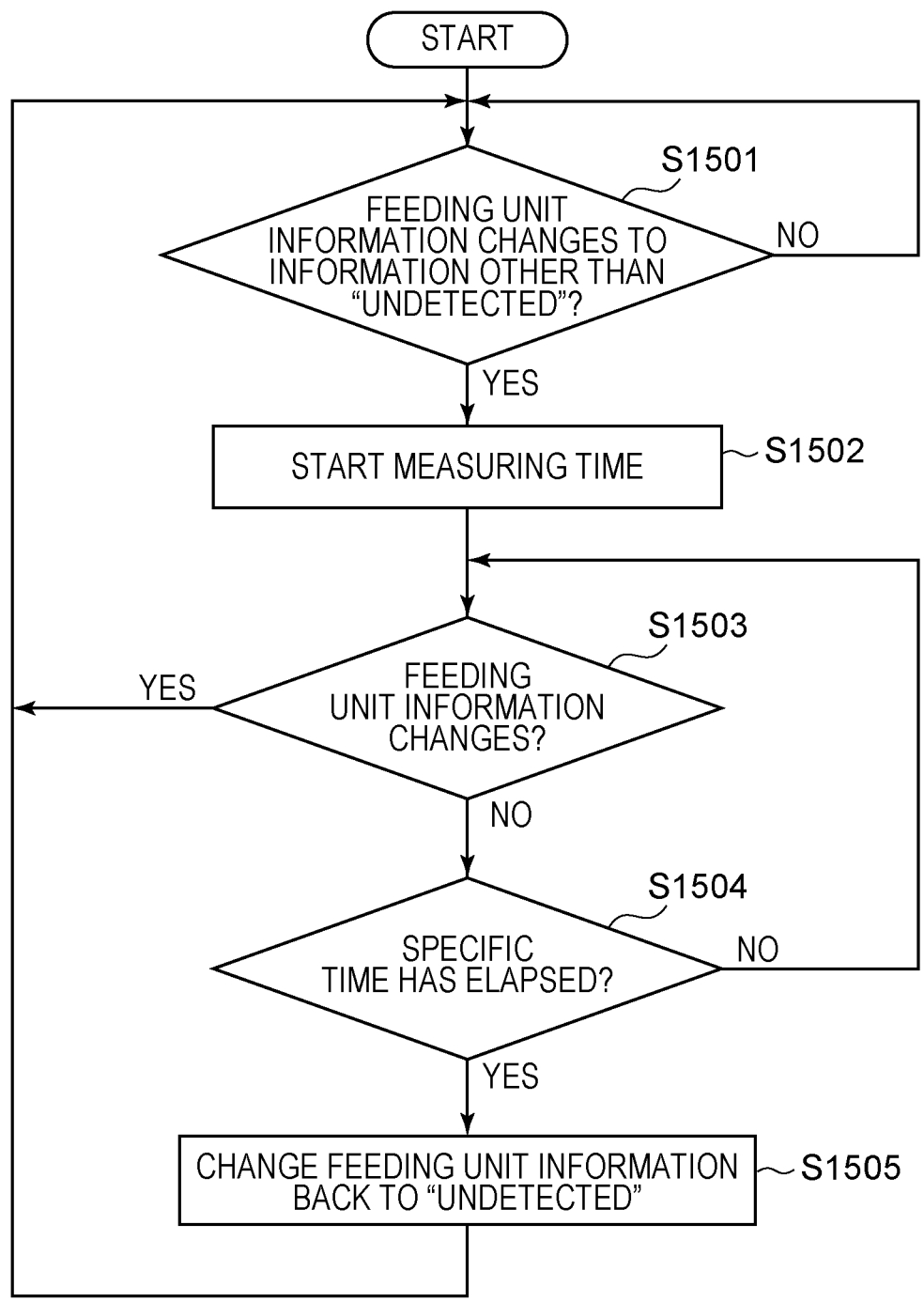
FIG. 15 is a flowchart of the operation of updating feeding unit information in accordance with elapsed time.

FIG. 15 is a flowchart illustrating a process of updating the feeding unit information in accordance with elapsed time. Note that the process illustrated in FIG. 15 is executed while the power of the printing apparatus 100 is on and until the power is turned off.

With the process illustrated in FIG. 10 or 13 described above, the CPU 206 determines whether the feeding unit information has changed to information other than "undetected" (S1501). In response to this change (YES in S1501), the process proceeds to S1502. The CPU 206 starts measuring elapsed time (S1502). In S1503, the CPU 206 determines whether the feeding unit information has been updated during the measurement of time, and, if the feeding unit information has been updated (YES in S1503), the process returns to S1501. In response to a change of the feeding unit information to information other than "undetected", the processing in S1502 is executed again, thereby resetting the elapsed time that has been measured.

The CPU 206 determines whether a specific time has elapsed as the elapsed time since the processing in S150 (S1504). When the specific time has elapsed (YES in S1504), the CPU 206 changes the feeding unit information back to "undetected" in S1505.

With the process illustrated in FIG. 15, for example, in the case where a specific time has elapsed since the user operated a feeding unit or selected a feeding unit on the selecting screen, "undetected" is stored as the feeding unit information. This prevents the feeding unit checking screen (1103 or 1104) from being displayed in the case where a long period of time has elapsed since the user operated a feeding unit or selected a feeding unit.

As the above-mentioned specific time, for example, three hours, which is a period of time sufficiently longer than the time from an operation performed on a feeding unit to the start of printing, is set. After three hours, the relationship between the operation on the feeding unit and the subsequent printing has become sufficiently irrelevant, and accordingly, the feeding unit information is updated to "undetected".

With this processing, the feeding unit checking screen may be prevented from being displayed by the past operation on a feeding unit or the past selection of a feeding unit even though the feeding unit is correctly or appropriately designated in copy settings.

Fourth Embodiment

In a fourth embodiment, the case in which the printing apparatus 100 receives a print job from the host device 1600 and executes printing will be described. Note that the printing apparatus 100 is capable of executing the processes in the above-described first to third embodiments.

As described above, when the user performs copying with the printing apparatus 100, the user sets a feeding unit as a copy setting, and a value set to the feeding unit is used as a print setting. For example, in the case where the liquid crystal panel 101 of the printing apparatus 100 is small, the method of designating a feeding unit as described above is more likely to realize better operability than the method of setting a paper size and a paper type. Moreover, when performing copying, the user often performs an operation near the apparatus, and it is thus easy for the user to directly check which paper is loaded on which feeding unit. Therefore, a feeding unit may be appropriately designated.

However, when performing printing from the host device 1600, the user often sets a paper size and a paper type at the time of creating content using each application operating on the host device 1600. Therefore, the possibility of realizing higher operability is higher when designating a paper size and a paper type from the host device 1600 and performing printing than the user having to check which paper is loaded on which feeding unit and to select a feeding unit. Therefore, when printing is performed from the host device 1600, control as described below is performed.

Figure 16:
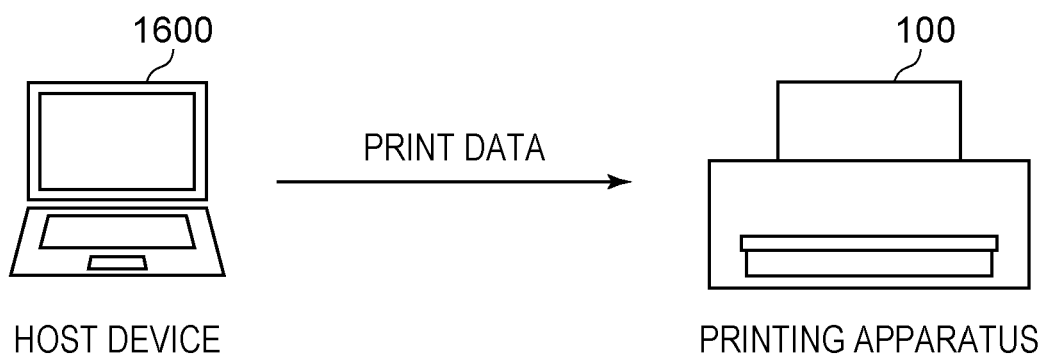
FIG. 16 is a schematic diagram of the printing apparatus and the host device.

FIG. 16 is a diagram illustrating the printing apparatus 100 and the host device 1600. The printing apparatus 100 is connected to the host device 1600 by a wireless LAN or a USB cable, receives print data via the communication unit 205, and performs printing.

Figure 17:
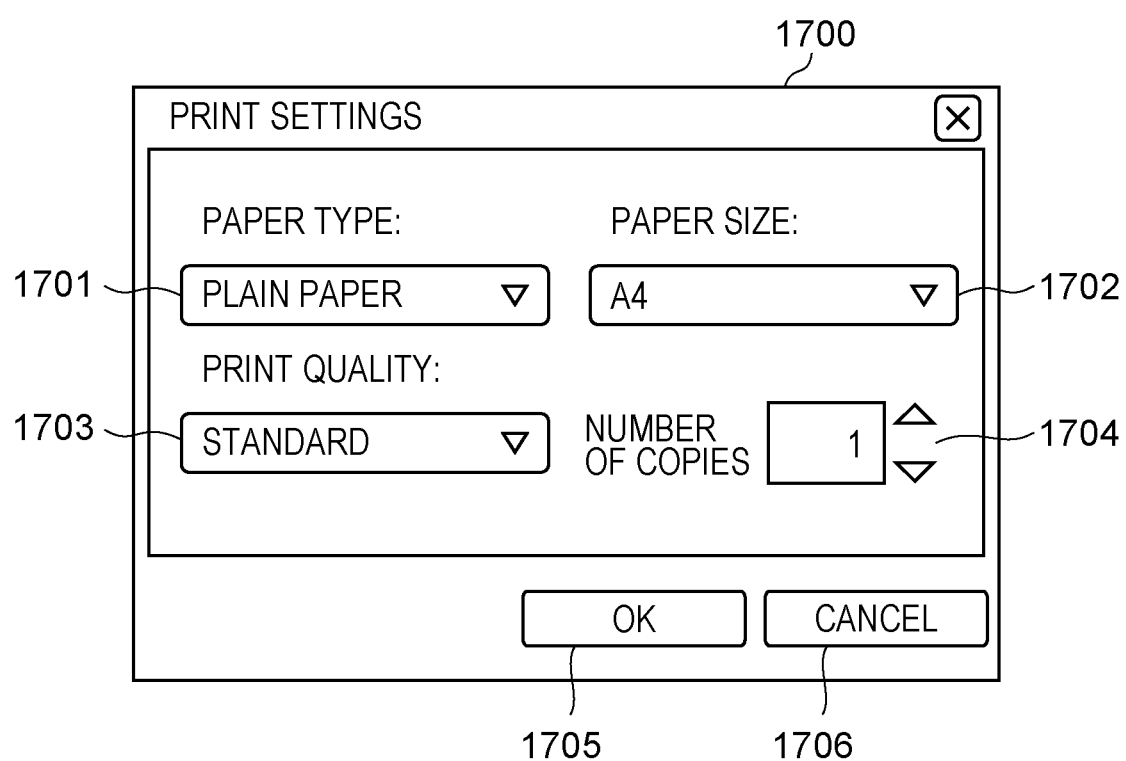
FIG. 17 is a diagram illustrating a print setting screen displayed on the host device.

FIG. 17 is a diagram illustrating a print setting screen displayed on the host device 1600. To perform printing from the host device 1600, a print operation is performed from each application (not illustrated) that creates, selects, and processes text, photographs, and the like. In response to the operation, a printer driver according to the printing apparatus 100 that is installed in the host device 1600 is activated, and then the screen illustrated in FIG. 17 is displayed by the printer driver on the host device 1600. The user makes settings of items on the print setting screen and gives a print command to the printer driver, which in turn sends print data including information of the print settings to the printing apparatus 100.

A print setting screen 1700 is provided with pull-down menus 1701, 1702, and 1703 for selecting a paper type, a paper size, and print quality, respectively. Increase/decrease buttons 1704 are for setting the number of copies. An OK button 1705 is for confirming the settings, and a cancel button 1706 is for canceling the settings.

Figure 18:
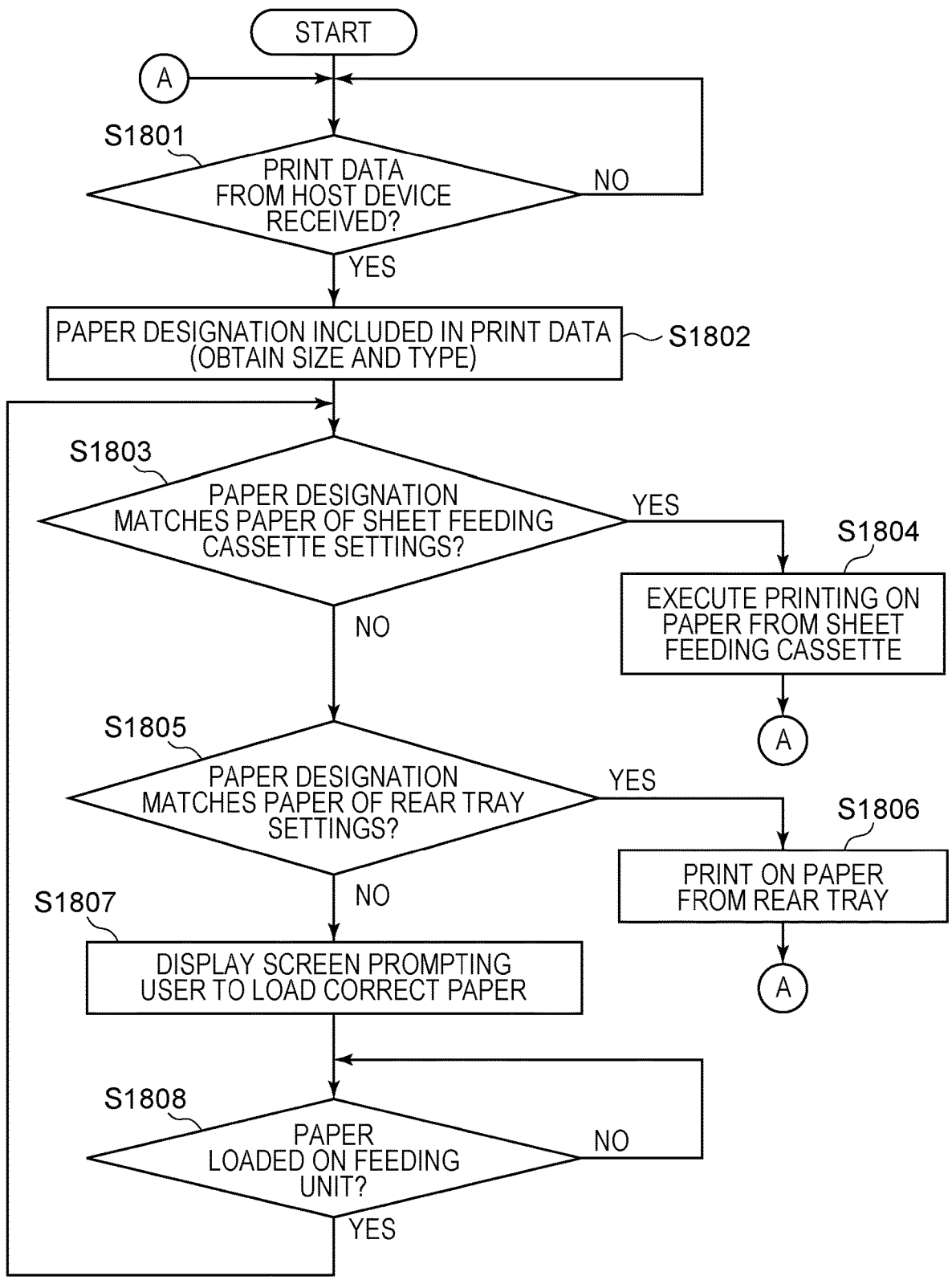
FIG. 18 is a flowchart of the operation when the printing apparatus receives print data from the host device.
Figure 19:
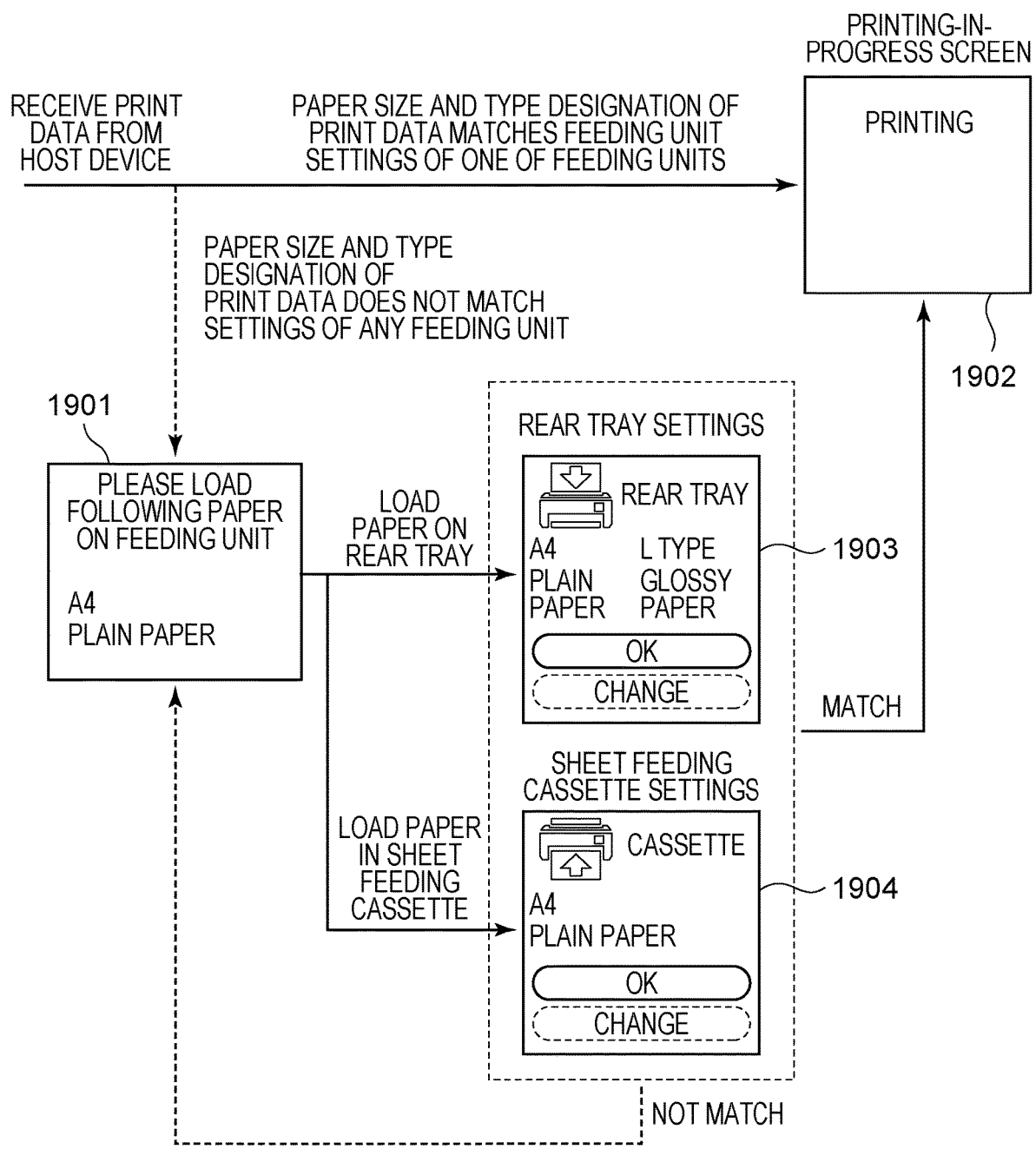
FIG. 19 is a diagram illustrating a display screen displayed when the printing apparatus receives print data from the host device.

FIG. 18 is a flowchart illustrating a process when the printing apparatus 100 receives print data from the host device 1600. FIG. 19 is a diagram illustrating a screen displayed when the process illustrated in FIG. 18 is being executed. Note that the process of the flowchart illustrated in FIG. 18 starts in response to turning on the power of the printing apparatus 100, and ends in response to turning off the power of the printing apparatus 100.

On receipt of print data from the host device 1600 (YES in S1801), the CPU 206 obtains paper designation (paper size and paper type) from print settings included in the print data (S1802).

The CPU 206 respectively compares the paper size and the paper type serving as the print designation with a paper size and a paper type of the sheet feeding cassette settings (S1803). If both the paper size and the paper type match (YES in S1803), the CPU 206 causes the printing mechanism 208 to feed sheets stored in the sheet feeding cassette 104 and to execute printing (S1804).

In the case where either the paper size or the paper type does not match in S1803, the process proceeds to S1805. The CPU 206 respectively compares the paper size and the paper type serving as the print designation with a paper size and a paper type of the rear tray settings (S1805). If both the paper size and the paper type match (YES in S1805), the CPU 206 causes the printing mechanism 208 to feed sheets stored on the rear tray 105 and to execute printing (S1806). In S1804 and S1806, a printing-in-progress screen 1902 is displayed.

In the case where either the paper size or the paper type does not match in S1805, the CPU 206 displays, on the liquid crystal panel 101, a screen 1901 for prompting the user to load sheets in or on a feeding unit corresponding to the print settings (S1807). The CPU 206 determines whether sheets have been loaded in or on a feeding unit. The determination method here is the same as or similar to detection of an operation on a feeding unit, which has been described with reference to FIG. 6. In response to loading of sheets on the rear tray 105, the CPU 206 display a rear tray setting screen 1903; and, in response to loading of sheets in the sheet feeding cassette 104, the CPU 206 displays a sheet feeding cassette setting screen 1904. On these setting screens, the user may set a paper size and a paper type for the respective feeding units using a method that is the same as or similar to the method described with reference to FIGS.

7A and 7B. When the processing in S1803 or S1808 is executed again and the paper size and the paper type of the feeding unit settings respectively match the print settings, printing is executed on sheets fed from the feeding unit for which the feeding unit settings are made.

As described with reference to FIGS. 18 and 19, in printing from the host device, the user designates the paper size and the paper type, not the feeding unit. In the case where the paper size and the paper type do not match the feeding unit settings, a screen for changing the feeding unit settings is displayed, instead of the feeding unit checking screen described with reference to FIGS. 10 and 11.

That is, since the apparatus operated by the user is different between printing from the host device and copying, an appropriate printing method and screen display according to the apparatus being operated may be performed.

Fifth Embodiment

In a fifth embodiment, in addition to the process described in the fourth embodiment, in the case where print data received from the host device 1600 is printed on sheets fed from a feeding unit indicated by feeding unit information, a process of setting the feeding unit information to "undetected" will be described. Note that the printing apparatus 100 is capable of executing the processes described in the first to fourth embodiments.

Figure 12:
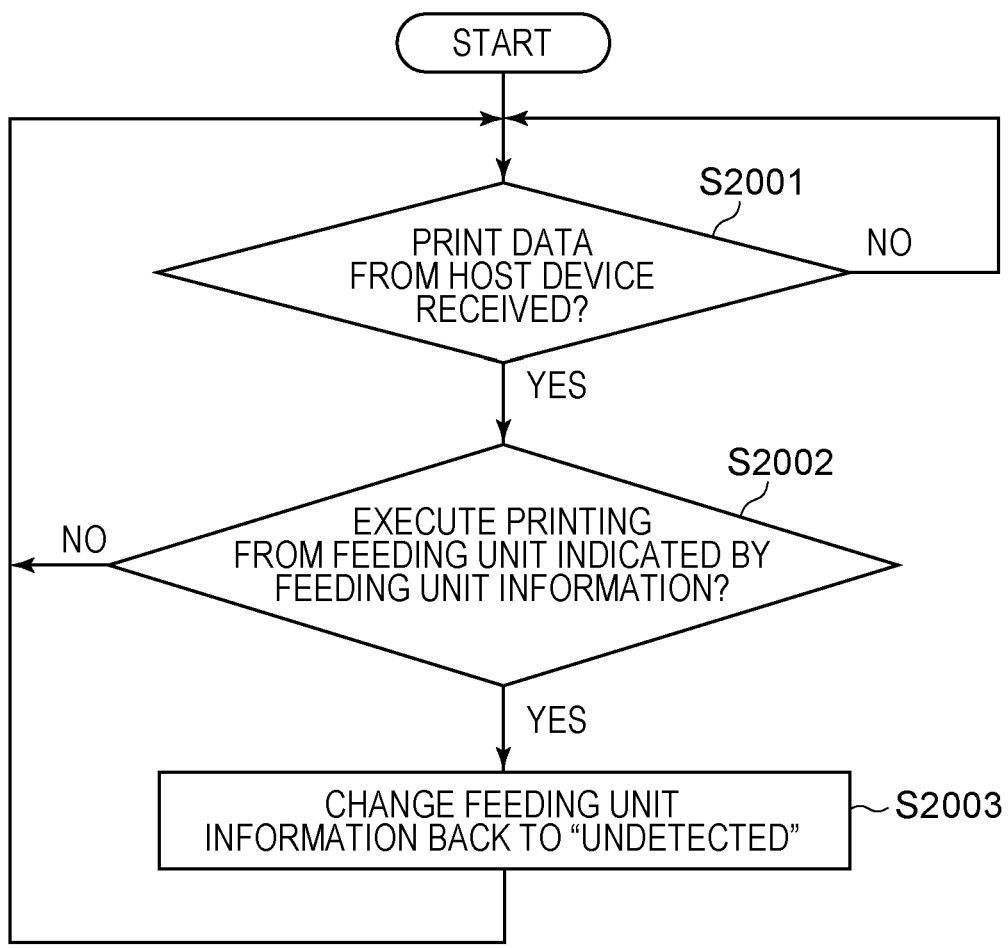
FIG. 12 is a flowchart of the operation of the printing apparatus on receipt of print data from a host device.

FIG. 12 is a flowchart illustrating a process when the printing apparatus 100 receives print data from the host device 1600. Note that the process illustrated in FIG. 12 starts in response to turning on the power of the printing apparatus 100, and is executed until the power is turned off.

When the CPU 206 receives print data from the host device 1600 (YES in S2001), the process proceeds to S2002. In printing executed by the process illustrated in FIG. 18, if the CPU 206 determines that sheets have been fed from a feeding unit indicated by feeding unit information and printing has been performed (YES in S2002), the process proceeds to S2003. Then, the CPU 206 updates the feeding unit information to "undetected" (S2003).

According to the above description, it is assumed that, for example, in order for the user to send photo data from the host device 1600 and to execute printing in a state where the feeding unit designation in copying is "sheet feeding cassette", the user loads photo paper in the rear tray. In this case, the feeding unit information is updated to "rear tray". Thus, if copying is executed after printing of the photo, the feeding unit is different between the feeding unit information and the feeding unit designation in copying, and therefore, a feeding unit checking screen is displayed.

However, because loading of photo paper on the rear tray is for printing from the host device 1600, there is, in the first place, no need to display a feeding unit checking screen when executing copying afterwards.

To this end, by updating the feeding unit information to "undetected" by the process illustrated by the flowchart in FIG. 12, control may be applied not to display an unnecessary feeding unit checking screen when executing copying.

According to the above embodiment, a predetermined screen is displayed in the case where the feeding unit that the user has last operated is different from a feeding unit designated in copy settings. Therefore, for example, a predetermined screen is displayed when, at the time the user gives a copy command after loading sheets in or on a feeding unit, that feeding unit is not designated in copy settings. It is thus possible to prevent unintentional printing on sheets different from sheets loaded by the user.

Note that the printing apparatus 100 need not be configured to be capable of executing all of the above-described processes, but may be configured to be capable of executing an appropriate combination of the above-described processes.

In the above-described embodiments, various processes illustrated by the flowcharts and screen display are realized by the printing apparatus. However, alternatively, these processes and screen display may be performed by an external apparatus connected to the printing apparatus. In this case, the result of detecting a feeding unit operated by the user is sent from the printing apparatus to the external apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as anon-transitory computer-readable storage medium) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-147730, filed Aug. 9, 2019, which is hereby incorporated by reference herein in its entirety.

What is claimed is:

1. A printing apparatus including a plurality of feeding units, the printing apparatus comprising:
  a sensor configured to detect a respective operation on each of the plurality of feeding units; and
  one or more processors which, by executing a program, perform operations including:
  designating, in response to a designation operation by a user via a display, which of the plurality of feeding units is to be used for printing, and
  controlling, in response to a command to execute predetermined printing, a process based on a first feeding unit, from the plurality of feeding units, on which an operation has been last detected by the sensor and a designated second feeding unit from the plurality of feeding units, wherein, based on the first feeding unit and the second feeding unit being different, controlling includes displaying, as the process, a predetermined screen on the display, wherein, based on the first feeding unit and the second feeding unit being the same, controlling includes executing, as the process, the predetermined printing on a sheet fed from the second feeding unit, and wherein, from when the predetermined screen is displayed until the sensor detects an operation on any of the plurality of feeding units, the predetermined screen is not displayed in response to the command to execute the predetermined printing.

2. The printing apparatus according to claim 1, wherein the one or more processors perform further operations including setting a respective setting for each of the plurality of feeding units in response to a setting operation by the user via the display, and wherein controlling includes executing the predetermined printing in accordance with a print setting set for the designated second feeding unit.

3. The printing apparatus according to claim 2, wherein, in a case where the sensor detects an operation on one feeding unit in the plurality of feeding units, setting includes displaying a setting screen for making a print setting for the one feeding unit, and, in response to a command from the user on the setting screen, set the print setting for the one feeding unit.

4. The printing apparatus according to claim 2, wherein the one or more processors perform further operations including storing information, wherein, in a case where the sensor detects an operation on one feeding unit in the plurality of feeding units, storing includes storing information indicating the one feeding unit, and wherein controlling includes displaying the predetermined screen or executing the predetermined printing based on a feeding unit indicated by the information which has been last stored.

5. The printing apparatus according to claim 4, wherein, in response to a display operation by the user via the display, setting includes displaying the setting screen corresponding to one of the plurality of feeding units, and wherein storing includes storing information indicating, as the first feeding unit, a feeding unit corresponding to the displayed setting screen.

6. The printing apparatus according to claim 1, wherein, from when power of the printing apparatus is turned on until the sensor detects an operation on any of the plurality of feeding units, the predetermined screen is not displayed in response to the command to execute the predetermined printing.

7. The printing apparatus according to claim 1, wherein the predetermined printing includes copying that includes reading of an original and printing.

8. The printing apparatus according to claim 1, wherein the printing apparatus is capable of printing print data received from an external apparatus.

9. The printing apparatus according to claim 8, wherein, from when the first feeding unit is used for printing the print data received from the external apparatus until the sensor detects an operation on any of the plurality of feeding units, the predetermined screen is not displayed in response to the command to execute the predetermined printing.

10. The printing apparatus according to claim 8, wherein, in printing the print data received from the external apparatus, a feeding unit selected in accordance with a respective print setting for each of the plurality of feeding units and a print setting corresponding to the print data are used.

11. The printing apparatus according to claim 1, wherein, from when a specific time has elapsed since the sensor detects an operation on any of the plurality of feeding units until the sensor detects another operation on any of the plurality of feeding units, the predetermined screen is not displayed in response to the command to execute the predetermined printing.

12. A method for a printing apparatus including a plurality of feeding units, the method comprising:

detecting a respective operation on each of the plurality of feeding units;

designating, in response to a designation operation by a user via a display, which of the plurality of feeding units is to be used for printing; and controlling, in response to a command to execute predetermined printing, a process based on a first feeding unit, from the plurality of feeding units, on which an operation has been last detected and a designated second feeding unit from the plurality of feeding units, wherein, based on the first feeding unit and the second feeding unit being different, controlling includes displaying, as the process, a predetermined screen on the display, wherein, based on the first feeding unit and the second feeding unit being the same, controlling includes executing, as the process, the predetermined printing on a sheet fed from the second feeding unit, and wherein, from when the predetermined screen is displayed until detecting includes detecting an operation on any of the plurality of feeding units, the predetermined screen is not displayed in response to the command to execute the predetermined printing.

13. A non-transitory computer-readable storage medium storing a program to cause a computer to perform a method for a printing apparatus including a plurality of feeding units, the method comprising:

detecting a respective operation on each of the plurality of feeding units;

designating, in response to a designation operation by a user via a display, which of the plurality of feeding units is to be used for printing; and controlling, in response to a command to execute predetermined printing, a process based on a first feeding unit, from the plurality of feeding units, on which an operation has been last detected and a designated second feeding unit from the plurality of feeding units, wherein, based on the first feeding unit and the second feeding unit being different, controlling includes displaying, as the process, a predetermined screen on the display, wherein, based on the first feeding unit and the second feeding unit being the same, controlling includes executing, as the process, the predetermined printing on a sheet fed from the second feeding unit, and wherein, from when the predetermined screen is displayed until detecting includes detecting an operation on any of the plurality of feeding units, the predetermined screen is not displayed in response to the command to execute the predetermined printing.

14. The printing apparatus according to claim 1, wherein the predetermined screen is a screen indicating that a feeding unit used for feeding is the second feeding unit.

15. The printing apparatus according to claim 1, wherein, in a case where designating includes designating the second feeding unit to be used for printing, the predetermined screen is a screen inquiring whether or not feeding by the designated second feeding unit is acceptable for the user.

16. The printing apparatus according to claim 1,
wherein, in a case in which the printing apparatus accepts a first operation by the user after the predetermined screen is displayed, controlling includes executing the predetermined printing on the sheet fed from the second feeding unit, and
wherein, in a case in which the printing apparatus accepts a second operation, by the user and different from the first operation, after the predetermined screen is displayed, controlling includes executing a display process in which a screen for designating a feeding unit to be used for printing in the plurality of feeding units is displayed.

\* \* \* \* \*